US011117757B2

(12) United States Patent
Urata et al.

(10) Patent No.: US 11,117,757 B2
(45) Date of Patent: Sep. 14, 2021

(54) LINEAR CONVEYOR DEVICE

(71) Applicant: YAMAHA HATSUDOKI KABUSHIKI KAISHA, Iwata (JP)

(72) Inventors: Satoshi Urata, Shizuoka (JP); Hirokatsu Muramatsu, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 367 days.

(21) Appl. No.: 16/321,772

(22) PCT Filed: Sep. 21, 2016

(86) PCT No.: PCT/JP2016/077899
§ 371 (c)(1),
(2) Date: Jan. 29, 2019

(87) PCT Pub. No.: WO2018/055708
PCT Pub. Date: Mar. 29, 2018

(65) Prior Publication Data
US 2020/0010287 A1 Jan. 9, 2020

(51) Int. Cl.
*H02K 41/02* (2006.01)
*B65G 54/02* (2006.01)
*B65G 9/00* (2006.01)

(52) U.S. Cl.
CPC ............. *B65G 54/02* (2013.01); *H02K 41/02* (2013.01); *B65G 9/008* (2013.01); *B65G 2811/09* (2013.01)

(58) Field of Classification Search
CPC ...... H02K 41/02; H02K 41/03; H02K 41/031; B23P 19/002; B65G 54/02
USPC ...................... 198/463.1, 619, 690.1; 104/93
See application file for complete search history.

(56) References Cited

U.S. PATENT DOCUMENTS

| | | | |
|---|---|---|---|
| 4,838,146 A | 6/1989 | Stoll | |
| 5,492,066 A | 2/1996 | Nozaki et al. | |
| 5,582,107 A | 12/1996 | Nozaki | |
| 5,626,082 A | 5/1997 | Nozaki | |
| 5,664,503 A | 9/1997 | Kawai | |

(Continued)

FOREIGN PATENT DOCUMENTS

| | | |
|---|---|---|
| CN | 105059945 A | 11/2015 |
| JP | S63-044603 U | 3/1988 |

(Continued)

OTHER PUBLICATIONS

International Search Report issued in PCT/JP2016/077899; dated Dec. 20, 2016.

*Primary Examiner* — Douglas A Hess
(74) *Attorney, Agent, or Firm* — Studebaker & Brackett PC

(57) ABSTRACT

A linear conveyor device is installed on a platform having an upper surface which serves as a predetermined installation surface. The linear conveyor device includes a linear motor stator; a slider which includes a linear motor mover; a straight-line conveyance part formed by linearly connecting a plurality of modules to each other, the modules each including a base frame that has an upper surface having guide rails for guiding the movement of the slider and a lower surface facing the platform; and a base member disposed between the upper surface of the platform and the lower surfaces of the modules at a connecting portion between the modules, and configured to position and support the pair of modules to be connected to each other.

20 Claims, 19 Drawing Sheets

(56) References Cited

U.S. PATENT DOCUMENTS

| | | | |
|---|---|---|---|
| 6,191,507 B1 | 2/2001 | Peltier et al. | |
| 9,365,354 B2* | 6/2016 | Takagi | H02P 29/032 |
| 10,511,247 B2* | 12/2019 | Mukai | H02P 6/16 |
| 10,734,880 B2* | 8/2020 | Urata | H02K 41/031 |
| 10,759,607 B2* | 9/2020 | Mukai | H02K 41/02 |
| 10,954,073 B2* | 3/2021 | Hayashi | B65G 25/04 |
| 2011/0198947 A1 | 8/2011 | Lin | |
| 2015/0349618 A1 | 12/2015 | Kleinikkink et al. | |
| 2016/0118871 A1 | 4/2016 | Chen et al. | |

FOREIGN PATENT DOCUMENTS

| | | |
|---|---|---|
| JP | H07-046817 A | 2/1995 |
| JP | H09-308018 A | 11/1997 |
| JP | 2000-312463 A | 11/2000 |
| JP | 2001-211631 A | 8/2001 |
| TW | 201616792 A | 5/2016 |

\* cited by examiner

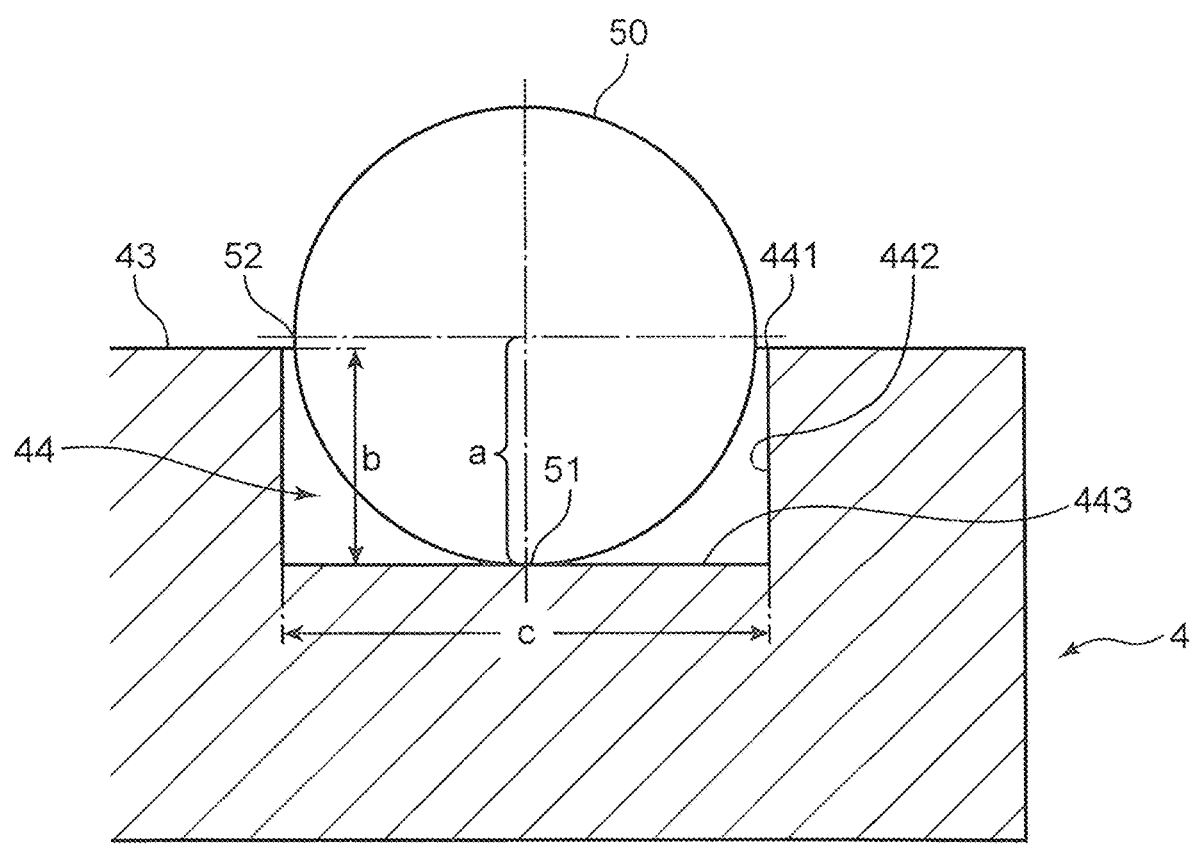

LINEAR CONVEYOR DEVICE

CROSS-REFERENCE TO RELATED APPLICATION

This application is a National Stage of International Patent Application No. PCT/JP2016/077899, filed Sep. 21, 2016, the entire content of which is incorporated herein by reference.

BACKGROUND

Technical Field

The present disclosure relates to a linear conveyor device having a linear motor mover and a linear motor stator.

Background Art

There has been known a linear conveyor which linearly moves a slider along a guide rail using a linear motor as a drive source. In the case of a movable magnet type linear motor, the guide rail is assembled to a base frame on which a linear motor stator is mounted, and a linear motor mover is mounted on the slider. The linear motor stator is an electromagnet disposed parallel to the guide rail, and the linear motor mover is a permanent magnet. A propulsion force is given to the slider with the supply of electricity to the electromagnet. The linear conveyor includes a linear scale formed of a magnetic scale mounted on the slider and a magnetic sensor mounted on the base frame. By controlling the supply of electricity to the electromagnet based on a position detection result by the linear scale, the slider is moved to a predetermined position as described, for example, in U.S. Pat. No. 6,191,507.

A conveyance path length which a linear conveyor is to satisfy varies depending on a user. Further, there may be also a case where once the linear conveyor is installed, a change of a conveyance path length is required. Accordingly, it is desirable to construct a linear conveyor having a desired conveyance path length by forming a stator side of the linear conveyor into modules and by connecting the modules in series. In this case, each module includes a base frame having a predetermined length, a guide rail, an electromagnet, and a magnetic sensor, and a power supply control of an electromagnet is performed per module.

Conventionally, in connecting the modules to each other, a connection block which connects guide rails to each other is used. With such a configuration, the guide rails can be connected to each other with high accuracy, while the connection between electromagnets with high accuracy and the connection between magnetic sensors with high accuracy become difficult. For example, when the arrangement pitch of the electromagnets is disturbed at the connecting portion between the modules, a speed ripple of the slider is increased. Further, when the arrangement of magnetic sensors is disturbed, positioning accuracy of the slider is lowered.

Further, the linear conveyor (module) is installed on a platform which a user prepares. That is, the base frame which supports the guide rails and the like are directly installed on the platform. However, in the case where a state of the platform is not suitable for installation of the linear conveyor, for example, in the case where flatness of the platform is bad or a stepped portion exists on the platform, the connection of the modules to each other with high accuracy becomes further difficult.

SUMMARY

Accordingly, the present disclosure provides a linear conveyor device where modules of the linear conveyor can be easily connected to each other with high accuracy.

A linear conveyor device according to one aspect of the present disclosure is a linear conveyor device installed on a predetermined installation surface, the linear conveyor device including: a linear motor stator; a slider which includes a linear motor mover; a straight-line conveyance part formed by linearly connecting a plurality of modules to each other, the modules each including an upper surface which has a guide portion for guiding movement of the slider and a lower surface which faces the installation surface; and a base member disposed between the installation surface and the lower surfaces of the modules at a connecting portion between the modules, and configured to position and support the modules.

Objects, technical features, and advantages of the present disclosure will become more apparent from the following detailed description and accompanying drawings.

BRIEF DESCRIPTION OF THE DRAWINGS

FIG. 6 is a cross-sectional view for describing a relationship between a ball which is an example of a semispherical protrusion which forms a positioning member and a holding hole for holding the ball;

DETAILED DESCRIPTION

[Overall Configuration of Linear Conveyor Device]

Figure 1:
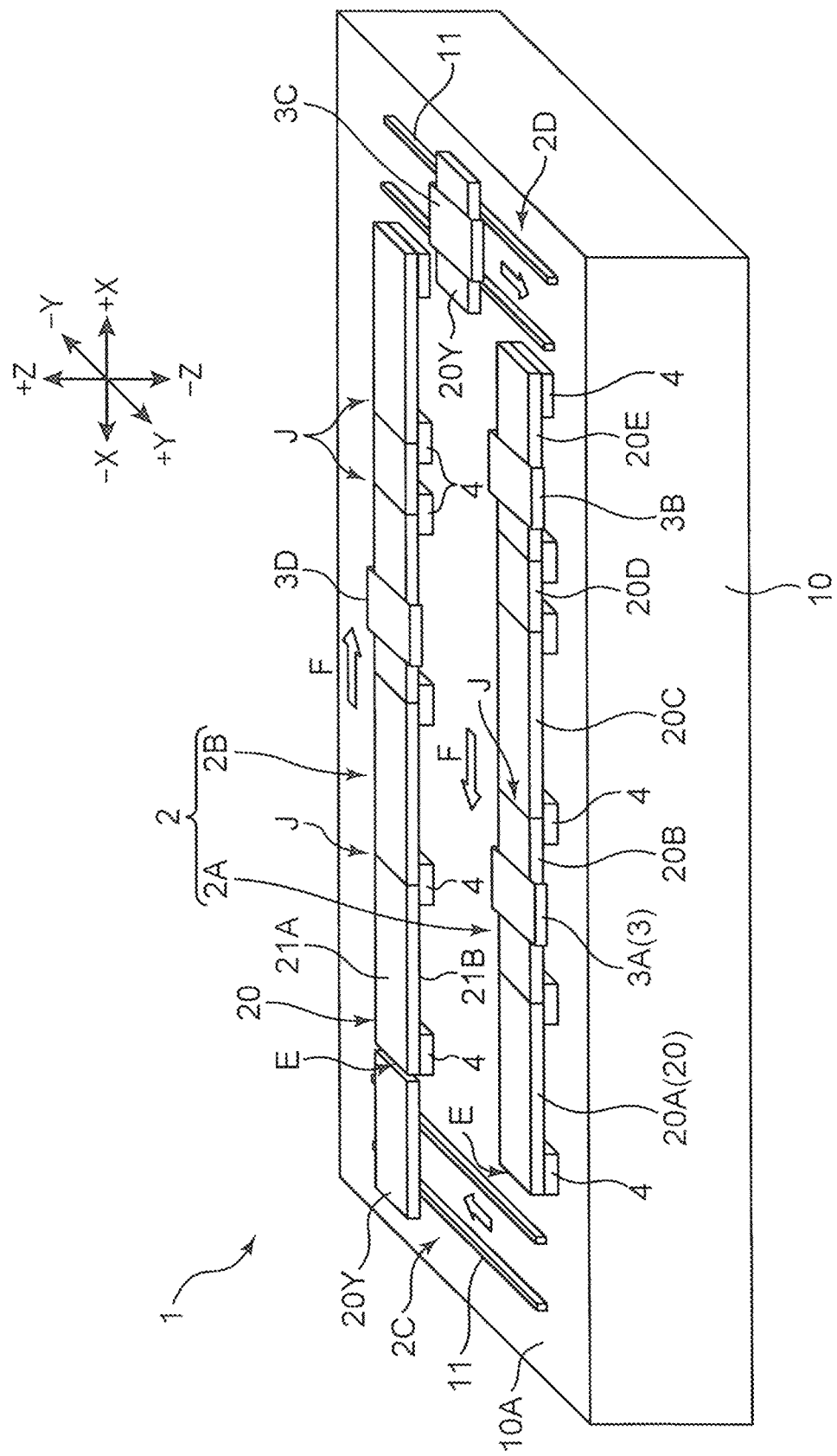
FIG. 1 is a perspective view schematically showing the overall configuration of a linear conveyor device according to an embodiment of the present disclosure.

Hereinafter, an embodiment of the present disclosure is described in detail with reference to drawings. FIG. 1 is a perspective view schematically showing the overall configuration of a linear conveyor device 1 according to an embodiment of the present disclosure. In FIG. 1, the indication of the XYZ directions is made. In FIG. 1, an X direction corresponds to a lateral direction (+X being a right side and −X being a left side), a Y direction corresponds to a longitudinal direction (+Y being a front side and −Y being a rear side), and a Z direction corresponds to a vertical direction (+Z being an upper side and −Z being a lower side). The same direction indication is also made in some other attached drawings.

The linear conveyor device 1 includes: a pair of straight-line conveyance parts 2 (a first straight-line conveyance part 2A and a second straight-line conveyance part 2B) which is mounted on a platform 10 and extends in the X direction; a first direction changing part 2C and a second direction changing part 2D which are positioned on a −X side end portion and on a +X side end portion of the straight-line conveyance parts 2, respectively; a slider 3 which moves along the straight-line conveyance parts 2; and base members 4 which support the straight-line conveyance parts 2 on the platform 10. The straight-line conveyance parts 2 are formed of the first straight-line conveyance part 2A disposed on the platform 10 on a +Y side and the second straight-line conveyance part 2B disposed on the platform 10 on a −Y side parallel to the first straight-line conveyance part 2A. The first and second direction changing parts 2C, 2D connect the straight-line conveyance parts 2A, 2B to each other on a −X side end portion and a +X side end portion thereof.

The platform 10 includes an upper surface 10A (installation surface) which forms an installation surface for installing the linear conveyor device 1. It is basically desirable that the upper surface 10A be a surface having high flatness. However, in this embodiment, since the linear conveyor device 1 is installed using the base members 4, it does not cause a serious problem even when flatness of the upper surface 10A is not so high, or even when a small step exists, or even when the platform 10 is formed of split carts and joints exist on the upper surface 10A.

The first and second straight-line conveyance parts 2A, 2B are conveyance parts for moving the slider 3 in the X direction. The first and second direction changing parts 2C, 2D are conveyance parts for moving the slider 3 in the Y direction, and transfer the slider 3 between the first and second straight-line conveyance parts 2A, 2B. That is, the first and second direction changing parts 2C, 2D change a conveying direction of the slider 3. The first and second straight-line conveyance parts 2A, 2B are fixed-side units of the linear motor, and the slider 3 is a movable-side unit of the linear motor.

The first and second straight-line conveyance parts 2A, 2B are each formed by linearly connecting a plurality of modules 20 having a function of guiding the slider 3. The module 20 is a unit block on a fixed side which forms the linear motor together with the slider 3, and is a short straight-line block having a length of approximately 0.2 m to 1.0 m. The module 20 (a base frame 21 described later) has an upper surface 21A and a lower surface 21B which faces the platform 10. The module 20 is supported on the base member 4 in a state where the lower surface 21B is separated from the upper surface 10A of the platform 10. The upper surface 21A is an upper surface in a context that the upper surface 21A is disposed on a side opposite to the lower surface 21B which faces the platform 10. That is, in an actual installation mode of the module 20, it does not always mean that the upper surface 21A is directed upward.

FIG. 1 shows an example where the first straight-line conveyance part 2A is formed of modules 20A, 20B, 20C, 20D, and 20E which are sequentially connected to each other from a −X direction to a +X direction. In FIG. 1, an example is exemplified where the module 20D has a length shorter than those of the other modules. The second straight-line conveyance part 2B also has substantially the same structure. In this manner, a moving path length of the slider 3 in the X direction can be set as desired by changing the number of modules 20 to be connected to each other or the combination of the modules 20 having different lengths.

The first and second direction changing parts 2C, 2D each include slide rails 11 and a changing module 20Y. The slide rails 11 are installed on the upper surface 10A of the platform 10 such that the slide rails 11 extend in the Y direction. The changing module 20Y is engaged with the slide rail 11 such that the changing module 20Y is movable in the Y direction along the slide rail 11. The changing module 20Y is movable between a terminal end portion E of the first straight-line conveyance part 2A and a terminal end portion E of the second straight-line conveyance part 2B, and is positioned and stopped with respect to the terminal end portions E by a drive mechanism not shown in the drawing.

The slider 3 is movable in a circulating manner on a circulatory path formed of the first and second straight-line conveyance parts 2A, 2B and the first and second direction changing parts 2C, 2D, the circulatory path being provided on the platform 10. FIG. 1 shows an example where four sliders 3A, 3B, 3C, and 3D are arranged on the circulatory path, and the sliders circulate in a slider moving direction F in a clockwise manner. The slider 3 moves from a +X side to a −X side of the first straight-line conveyance part 2A (also including a case where the slider 3 is moved in a reverse direction toward the +X side temporarily), and the slider 3 is transferred from the −X terminal end portion E to the changing module 20Y of the first direction changing part 2C. In a state where the slider 3 is mounted on the changing module 20Y, the changing module 20Y is moved in a −Y direction from the first straight-line conveyance part 2A to the second straight-line conveyance part 2B. Next, the slider 3 is transferred from the −X terminal end portion E to the second straight-line conveyance part 2B, and is moved toward the +X side. Then, the slider 3 is transferred to the changing module 20Y of the second direction changing part 2D, is moved in a +Y direction, and is transferred to the first straight-line conveyance part 2A again.

Although not shown in the drawing, along the circulatory path of the slider 3, various robots are disposed which perform the transfer of a workpiece such as a printed circuit board, an operation of mounting electronic parts and the like on the printed circuit board, for example. An upper surface of the slider 3 forms a placing surface on which the workpiece or the like is placed. The slider 3 is intermittently moved on the first and second straight-line conveyance parts 2A, 2B such that the slider 3 is stopped at an operation position of a robot which performs one step, and is moved toward an operation position of a robot which performs a next step after an operation in the above-mentioned one step is finished.

The base member 4 is disposed between the platform 10 and lower surfaces 21B of the modules 20 at a connecting portion J between the modules 20, and positions and supports a pair of modules 20 to be connected to each other. Further, base members 4 are also disposed at the terminal end portions E of the first and second straight-line conveyance parts 2A, 2B. Conventionally, the module 20 is directly attached to the platform 10. This embodiment is characterized in that the base member 4 is interposed between the modules 20 and the platform 10, and the modules 20 which are connected to each other are positioned by making use of the base member 4.

[Detail of Module and Slider]

Figure 2:
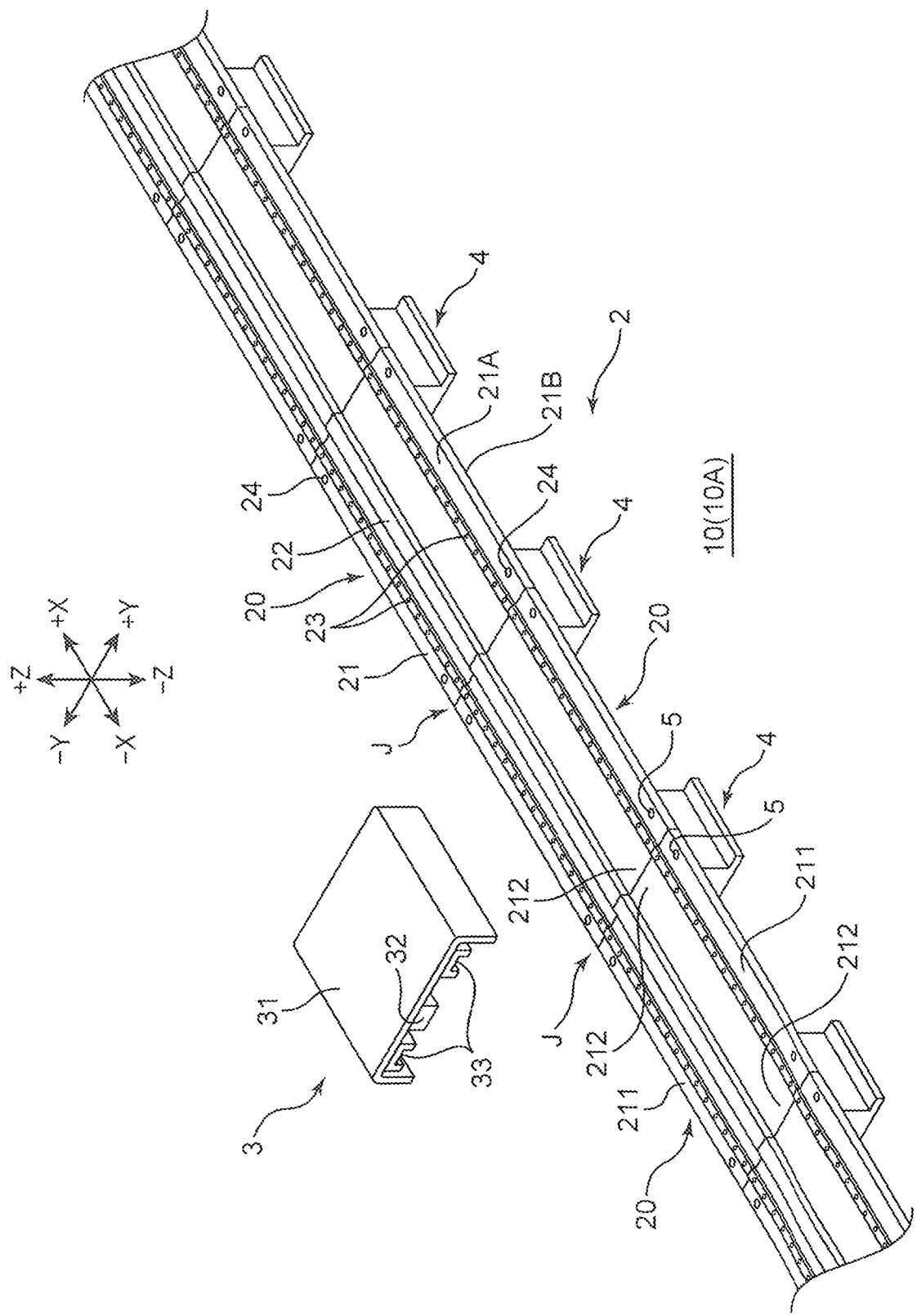
FIG. 2 is an exploded perspective view of a straight-line conveyance part (a connected body formed of modules) and a slider of the linear conveyor device.

The module 20 and the slider 3 are described further. FIG. 2 is an exploded perspective view of the straight-line conveyance part 2 (a connected body of the modules 20) and the slider 3. Each module 20 includes the base frame 21, a linear motor stator 22, and a pair of guide rails 23 (guide portions). The slider 3 has a slider frame 31, a linear motor mover 32, and a pair of guide blocks 33.

The base frame 21 is a frame made of metal such as aluminum, and is a flat-plate like member which forms the upper surface 21A and the lower surface 21B of the above-mentioned module 20. The upper surface 21A is a surface on which the linear motor stator 22 and the guide rails 23 are mounted. The lower surface 21B is a surface which faces the upper surface 10A of the platform 10 with a predetermined distance therebetween.

The linear motor stator 22 is an arranged body formed of a plurality of electromagnets. That is, the linear motor stator 22 is formed by arranging a plurality of unit electromagnets in a row in the X direction, the unit electromagnets each including a core and a coil wound around the core. The pair of guide rails 23 is members which guide the movement of the slider 3. The guide rails 23 are mounted on the upper surface 21A of the base frame 21 at the respective Y-direction end portions 211 (width direction) thus forming two raceways extending in the X direction. By connecting X-direction end portions 212 of the plurality of base frames 21 to each other in a butting manner, the unit guide rails 23 of the respective base frames 21 are connected to each other thus capable of forming the guide rail 23 extending in a limitless manner.

The slider frame 31 is formed of a metal block made of aluminum or the like, has an upper surface which serves as the placing surface on which the workpiece is placed, and has a shape which allows fitting of the slider frame 31 on the base frame 21 from the X-direction end portion 212. The linear motor mover 32 includes a plurality of permanent magnets arranged in the X direction, and a back yoke which holds the permanent magnets. The linear motor mover 32 is mounted on a lower surface of the slider frame 31 at the position which faces the linear motor stator 22. The plurality of permanent magnets are arranged such that an N pole and an S pole alternately appear on surfaces of the permanent magnets which face the linear motor stator 22.

A pair of guide blocks 33 is mounted on the lower surface of the slider frame 31 at positions which respectively face the pair of guide rails 23. The guide block 33 includes a bearing which rolls on the guide rail 23 in a contact manner, is engaged with the guide rail 23, and is moved in the X direction while being guided by the guide rail 23.

The linear motor mover 32 forms the linear motor together with the linear motor stator 22 on a base frame 21 side. By a motor controller not shown in the drawings, an electric current of any one of a U phase, a V phase, and a W phase which have different phases is supplied to the linear motor stator 22 (the coils of the electromagnets). With such an operation, a magnetic propulsion force is generated due to an interaction between a magnetic flux generated by the coils and a magnetic flux generated by the permanent magnets which the linear motor mover 32 has, and the slider 3 is moved by the propulsion force.

The pair of guide blocks 33 forms a linear guide together with the pair of guide rails 23. The slider 3 which receives the propulsion force advances linearly in the X direction along the guide rails 23. Although not shown in the drawings, magnetic sensors are disposed on the upper surface 21A of the base frame 21, and a magnetic scale is mounted on a lower surface of the slider 3. The magnetic sensors and the magnetic scale form a linear scale which detects the position of the slider 3. By controlling the power supply to the coils of the electromagnets based on a position detection result of the position of the slider 3 detected by the linear scale, the slider 3 is moved to the target position.

[Base Member]

Figure 3:
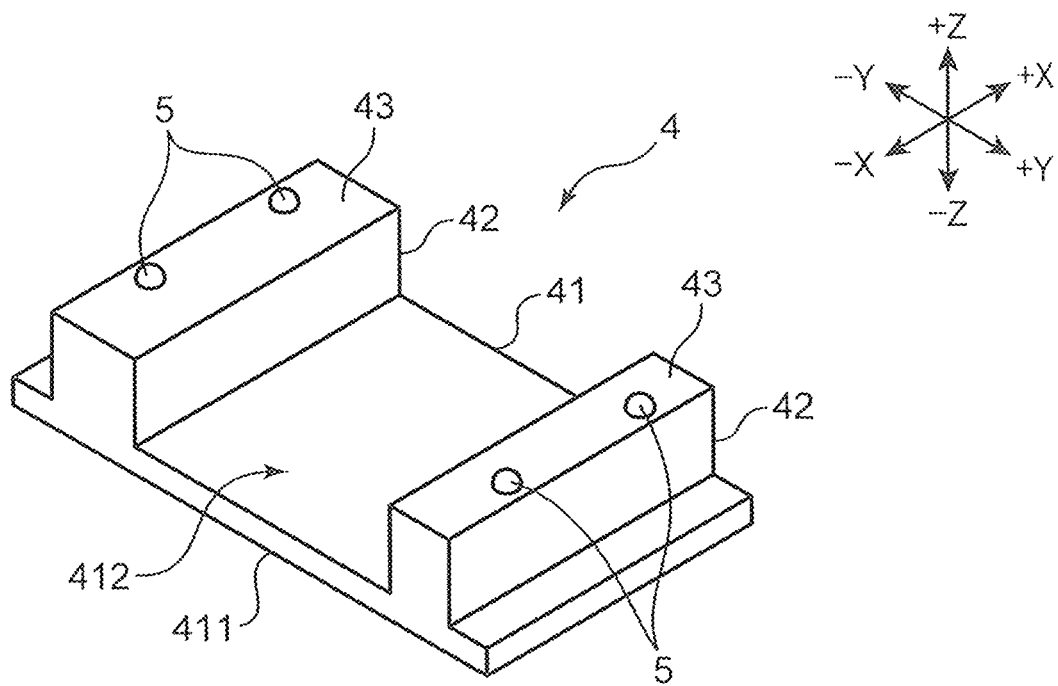
FIG. 3 is a perspective view of a base member where the module is supported on a platform.

FIG. 3 is a perspective view of a single body of the base member 4. The base member 4 is formed of a metal block made of metal having excellent rigidity such as aluminum. The base member 4 includes a flat plate like bottom plate 41, and a pair of protruding ridges 42 formed upright on the bottom plate 41 respectively in the vicinity of both ends of the bottom plate 41 in the Y direction and extending in the X direction. A bottom surface 411 of the bottom plate 41 is in contact with the upper surface 10A of the platform 10. An accommodating space 412 is formed between the pair of protruding ridges 42, and the accommodating space 412 is used as a space for accommodating a connector, a power source device and the like for the module 20.

Upper surfaces of the pair of protruding ridges 42 are support surfaces 43 which form mating surfaces with the lower surface 21B of the base frame 21. The support surfaces 43 support the X-direction end portions 212 of the pair of modules 20 (base frames 21) to be connected to each other from below. Four semispherical protrusions 5 (positioning members) are mounted on the support surfaces 43 in a protruding manner. The semispherical protrusions 5 are members for positioning the pair of modules 20. Receiving holes 24 into which the semispherical protrusions 5 are fitted are formed in the base frame 21. In this embodiment, by taking into account easiness of working, an example is exemplified where the receiving hole 24 is formed of a through hole. However, it is sufficient that the receiving hole 24 be formed at least on the lower surface 21B of the base frame 21 in a recessed manner. Protrusions having various shapes may be used as positioning members in place of the semispherical protrusions 5.

Figure 4A:
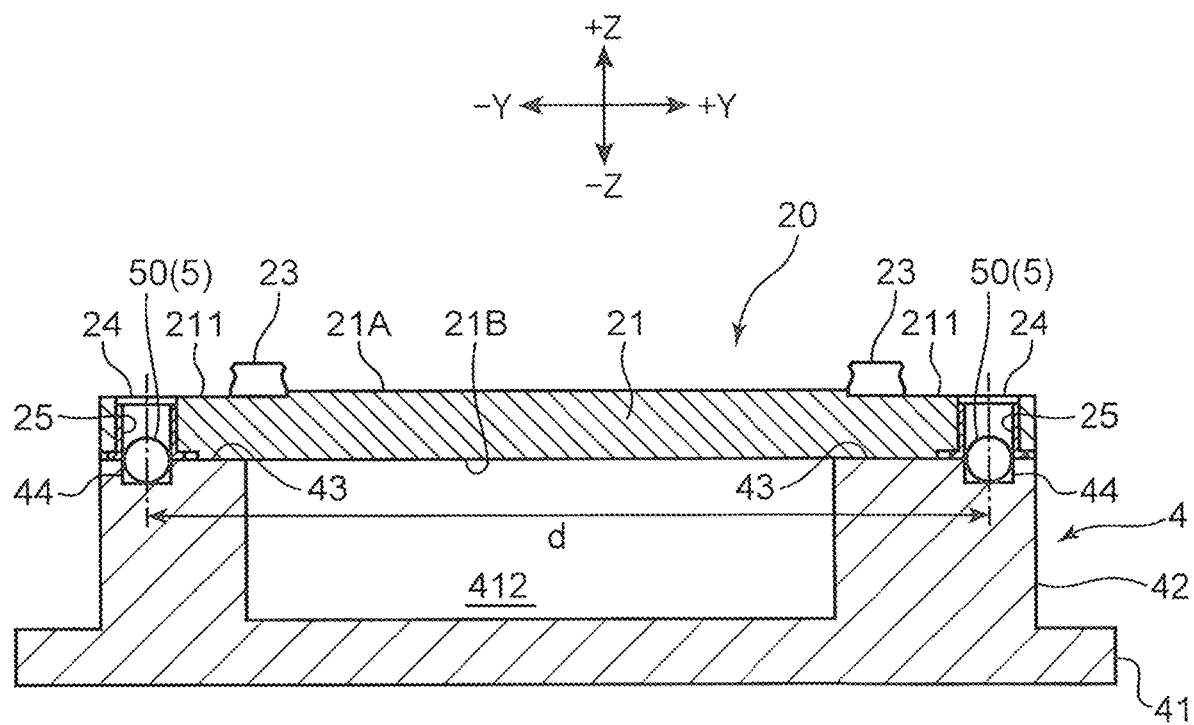
FIG. 4A is a cross-sectional view of the connecting portion of the modules taken along a plane extending in a Y direction.
Figure 4B:
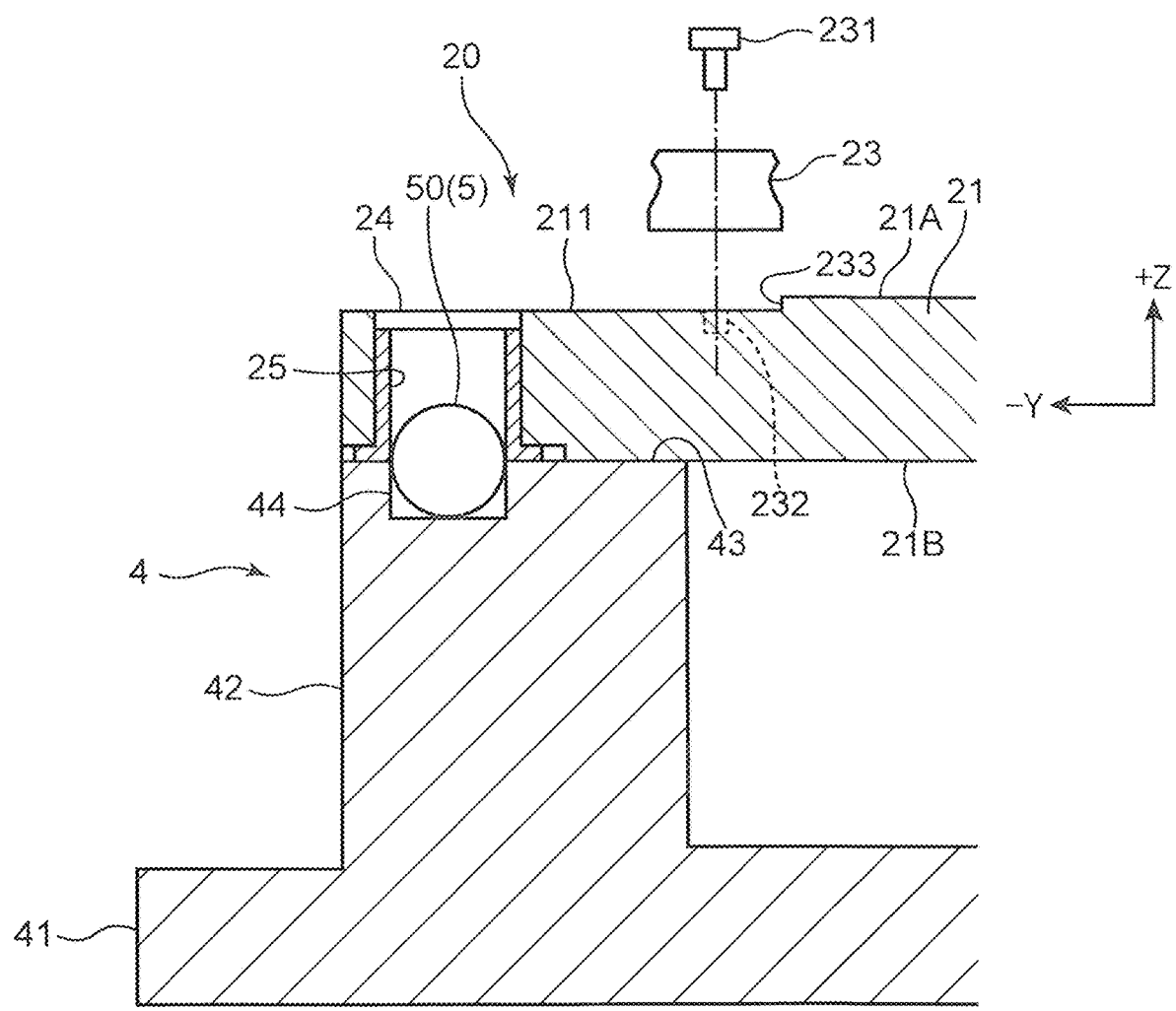
FIG. 4B is an enlarged cross-sectional view of a main part in FIG. 4A.
Figure 5A:
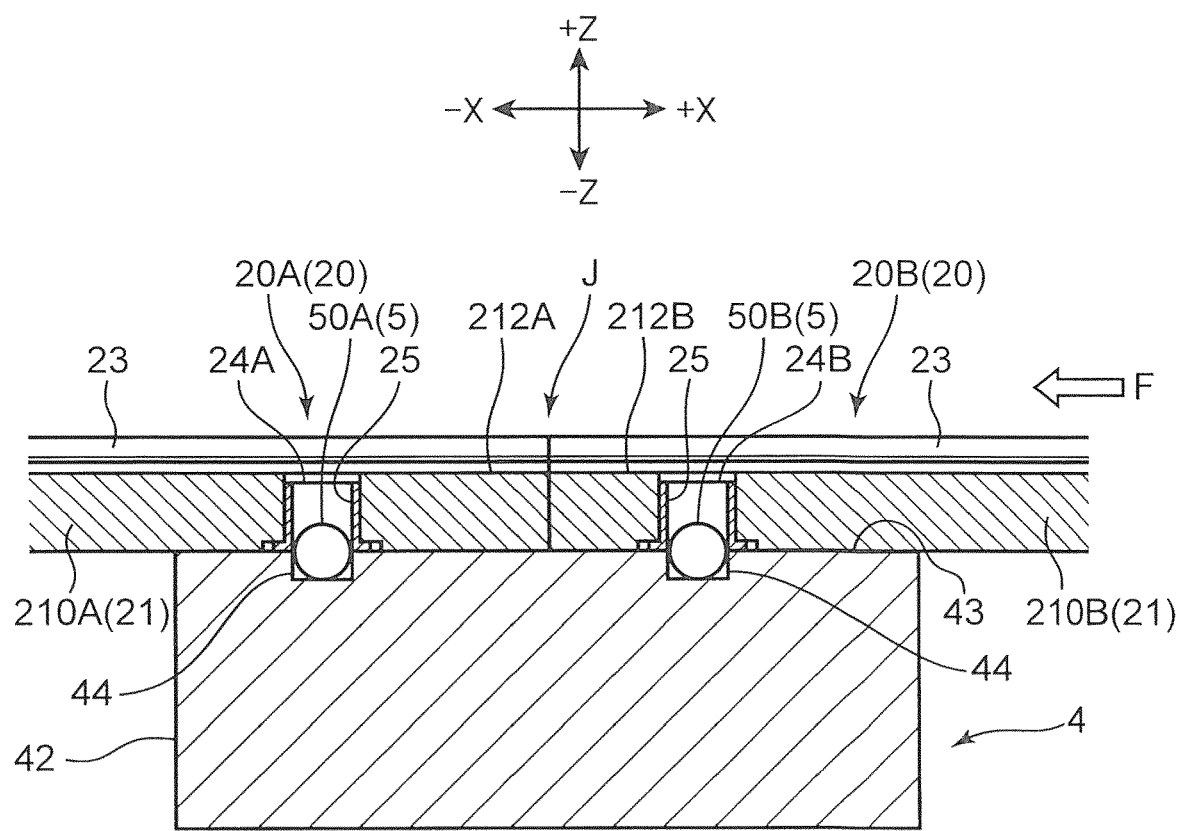
FIG. 5A is a cross-sectional view of the connecting portion of the modules taken along a plane extending in an X direction.
Figure 5B:
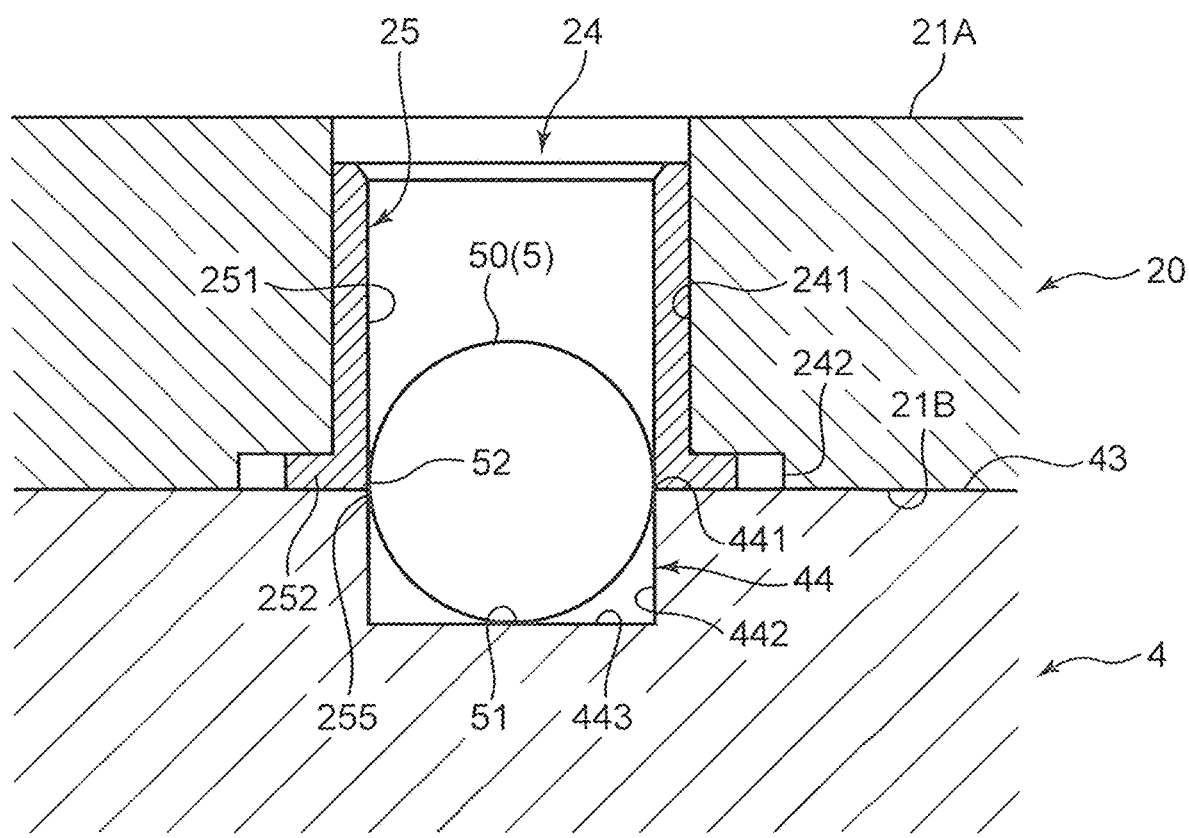
FIG. 5B is an enlarged cross-sectional view of a main part in FIG. 5A.

FIG. 4A is a cross-sectional view of a connecting portion J between the modules 20 taken along a plane extending in the Y direction, and FIG. 4B is an enlarged cross-sectional view of a main part in FIG. 4A. FIG. 5A is a cross-sectional view of the connecting portion J taken along a plane extending in the X direction, and FIG. 5B is an enlarged cross-sectional view of a main part in FIG. 5A. In this embodiment, an example is shown where the semispherical protrusion 5 shown in FIG. 3 is formed of a ball 50 which is a steel ball. Holding holes 44 are formed in the support surface 43 in a recessed manner such that the holding holes 44 face the receiving holes 24 formed in the base frame 21. The ball 50 is accommodated in the holding hole 44 such that at least an upper half of the ball 50 protrudes from the holding hole 44. That is, the semispherical protrusion 5 is formed of an upper half of the ball 50 accommodated in the holding hole 44. The ball 50 is brought into line contact with the receiving hole 24 (a portion of the module) in a state where the lower surface 21B and the support surface 43 are in contact with each other.

As shown in FIG. 4A, two (a plurality of) balls 50 are disposed in the width direction (Y direction) of the module 20. That is, the receiving holes 24 are formed in both of the Y-direction end portions 211 on a +Y side and a −Y side of the base frame 21 respectively. The holding holes 44 are also formed in a recessed manner in the pair of protruding ridges 42 (support surfaces 43) at the positions which correspond to the pair of receiving holes 24 in the Y direction. The balls 50 are fitted in the pair of receiving holes 24 and the pair of holding holes 44 on the +Y side and on the −Y side respectively. That is, in the Y direction, one module 20 is positioned by two balls 50. With such a configuration, the module 20 can be positioned stably in the Y direction.

As shown in FIG. 5A, two (a plurality of) balls 50 are disposed also in the moving direction (X direction) of the slider 3. That is, the holding holes 44 are formed in a recessed manner on the −X side and the +X side as viewed from the center of the protruding ridge 42 in the X direction. The receiving holes 24 of the respective base frames 21 of the pair of modules 20 to be connected to each other are respectively fitted on two balls 50 thus positioning the modules 20.

Positioning of the modules 20 in the X direction is described specifically. Out of the pair of modules connected to each other, assume the module on the −X side as the first module 20A and the module on the +X side as the second module 20B. In connecting the modules 20A, 20B, an end surface of the +X side end portion 212A of the first module 20A and an end surface of the −X side end portion 212B of the second module 20B are made to butt against each other. At the connecting portion J between the first and second modules 20A, 20B, the base member 4 is disposed such that the support surfaces 43 stride over lower surfaces of first and second base frames 210A, 210B of the first and second modules 20A, 20B. FIG. 5A shows an example where the end surfaces of both modules 20A, 20B are made to butt against each other at the center of the protruding ridges 42 in the X direction.

The first base frame 210A has first receiving holes 24A on the +X side end portion 212A, and the second base frame 210B has second receiving holes 24B on the −X side end portion 212B. Balls 50A held by the holding holes 44 formed in the base member 4 on the −X side are fitted in the first receiving holes 24A, and balls 50B held by the holding holes 44 formed in the base member 4 on the +X side are fitted in the second receiving holes 24B. Three or more balls 50 and three or more receiving holes 24 may be disposed in the X direction. In this manner, the first module 20A is positioned with respect to the base member 4 due to fitting engagement between the first receiving holes 24A of the first module 20A per se and the balls 50A, and the second module 20B is positioned with respect to the base member 4 due to fitting engagement between the second receiving holes 24B of the second modules 20B per se and the balls 50B. As a result of such positioning, the connecting portion J of the first and second modules 20A, 20B is formed. Accordingly, by controlling flatness of the support surfaces 43 and the positional relationship between the plurality of balls 50 on the base member 4 with high accuracy, the first and second modules 20A, 20B can be connected to each other with high accuracy.

The receiving holes 24 and the holding holes 44 can be formed by cutting. In this case, as shown in FIG. 4A, it is desirable that in a state where the base frame 21 is placed on the base member 4, cutting blades be brought into contact with the base frame 21 from a +Z side so that the receiving holes 24 and the holding holes 44 be formed by a single working operation. Further, it is desirable that the above-mentioned working be performed such that a distance d between an aligned hole axis of the pair of the receiving hole 24 and the holding hole 44 on the −Y side and an aligned hole axis of the pair of the receiving hole 24 and the holding hole 44 on the +Y side be ensured with high accuracy (an error being less than approximately 10 μm). The same applies to a distance between pairs of the receiving holes 24 and the holding holes 44 in the X direction.

It is desirable that the guide rails 23 be positioned using the positions of the holding holes 44, that is, the positions of the balls 50 as a reference. As shown in FIG. 4B, the guide rail 23 is mounted on an upper surface 21A of the Y-direction end portion 211 of the base frame 21. A butting surface 233 against which a lower side of the guide rail 23 butts is formed on the upper surface 21A by step forming. The guide rail 23 is positioned by being brought into contact with the butting surface 233, and is fixedly mounted on the base frame 21 by a fixing screw 231 and a screw hole 232 formed on the upper surface 21A in a recessed manner. By performing the step forming of the butting surface 233 as forming which is performed in series succeeding to forming of the receiving hole 24 and the holding hole 44, the position of the butting surface 233 can be set with respect to the ball 50 with high accuracy. Accordingly, positioning of the guide rail 23 with respect to the ball 50 can be performed with high accuracy.

The connecting portion J where the pair of modules 20 is positioned with high accuracy can be obtained by performing the above-mentioned forming. That is, the position of the guide rail 23 is determined based on the position of the ball 50 of the base member 4. Accordingly, by setting the positional relationship between the plurality of balls 50 with high accuracy, it is possible to achieve the connection of the guide rail 23 with high accuracy by merely fitting the balls 50 of the base member 4 provided corresponding to the receiving holes 24 of the pair of modules 20 to be connected to each other into the receiving holes 24.

[Detail of Receiving Hole and Holding Hole]

Figure 7:
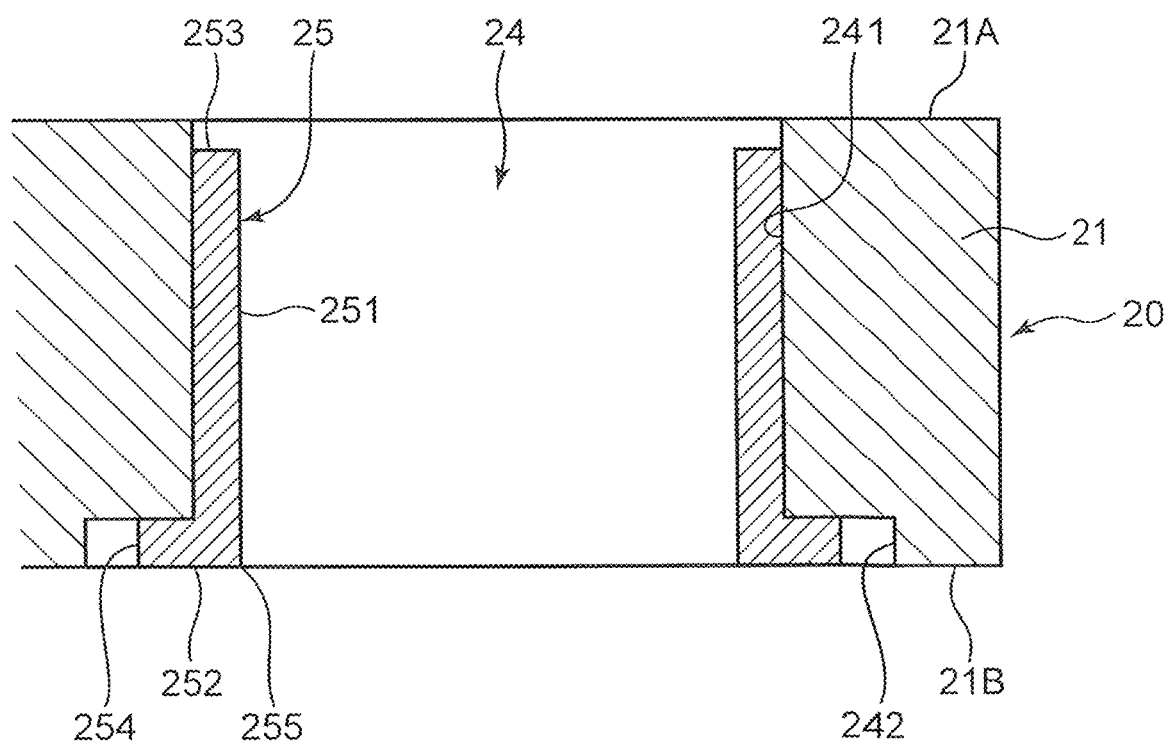
FIG. 7 is a cross-sectional view showing a receiving hole for receiving the ball.

The receiving hole 24 and the holding hole 44 are described in detail with reference to mainly FIG. 5B, FIG. 6, and FIG. 7. FIG. 6 is a cross-sectional view for describing a relationship between the ball 50 and the holding hole 44, and FIG. 7 is a cross-sectional view showing the receiving hole 24. In this embodiment, the holding hole 44 having a depth b slightly shorter than a radius a of the ball 50 and the receiving hole 24 into which bushing 25 (cylindrical member) is fitted tightly are exemplified.

As the ball 50, for example, a steel ball such as a martensite-based stainless steel ball or a carbon ball having a diameter of approximately 3 mm to 15 mm can be used. It is desirable that the ball 50 have high sphericity, and it is also desirable that such sphericity be approximately class 28 (tolerance: ±0.5 μm).

The holding hole 44 is a bottomed hole having a circular horizontal cross section and opening on the support surface 43. That is, the holding hole 44 includes: a circular opening edge 441 which defines an opening portion on the support surface 43; a circular cylindrical wall surface 442 vertically and downwardly extending from the opening edge 441; and a bottom surface 443 defining a bottom of the circular cylindrical wall surface 442. The opening edge 441 is an edge portion substantially having no chamfered structure (C: approximately 0.02 or less). The circular cylindrical wall surface 442 is a wall surface which defines a cavity in which the ball 50 is accommodated. The bottom surface 443 is a flat surface to which forming of a centering-use recessed portion or the like is not applied.

As shown in FIG. 6, the depth b from the opening edge 441 to the bottom surface 443 of the holding hole 44 is set slightly smaller than the radius a of the ball 50. For example, it is desirable that the depth b be set to an approximate value smaller than the radius a by 0.03 mm (b=a−0.03 mm). With such setting, a portion of the ball 50 having a largest circumscribed circle is exposed to the outside of the hole. Since the bottom surface 443 is a flat surface, it is possible to make the portion of the ball 50 having the largest circumscribed circle slightly project from the opening edge 441 of the holding hole 44 by merely accommodating the ball 50 in the holding hole 44 and by merely bringing a ball lower portion 51 into contact with the bottom surface 443. The portion of the ball 50 having the largest circumscribed circle is regarded as a contact portion 52 of the ball 50 which is brought into line contact with the receiving hole 24.

A diameter c of the holding hole 44 is set slightly larger than a diameter (2a) of the ball 50. For example, it is desirable that the diameter c be set to an approximate value larger than the diameter (2a) by 0.01 mm (c=2a+0.01 mm). It is not preferable that the ball 50 have a play in the holding hole 44. On the other hand, it is necessary to make the portion of the ball 50 having the largest circumscribed circle protrude to the outside of the holding hole 44 by bringing the ball 50 into contact with the bottom surface 443 with certainty. By setting the diameter c of the holding hole 44 as describe above, it is possible to satisfy both a demand for the suppression of a play of the ball 50 and a demand for insertability of the ball 50 into the holding hole 44. Further, chamfering is not substantially applied to the opening edge 441 as described above and hence, it is possible to prevent the occurrence of irregularities in the diameter c of the holding hole 44.

Although the ball 50 may be held in a state where the ball 50 is accommodated in the holding hole 44 in a rolling manner, it is desirable to fix the ball 50 using an adhesive agent or the like. For example, an adhesive agent is filled in the holding hole 44 by potting in advance and, thereafter, the ball 50 is fitted in the holding hole 44 and the adhesive agent is hardened thus bringing the ball 50 into a fixed state. With such a configuration, the removal of ball 50 from the holding hole 44 can be prevented.

The bushing 25 is a cylindrical member formed of a member having higher hardness than base frame 21 (aluminum). That is, the bushing 25 has a strength which prevents the deformation of the bushing 25 even when the bushing 25 is brought into contact with the ball 50. For example, it is desirable to use the bushing 25 made of high hardness steel having hardness of HRC55 class or more.

The receiving hole 24 is a hole having a circular horizontal cross section, and is formed of a hole body 241 and a large diameter portion 242 continuously formed on a lower end of the hole body 241. The large diameter portion 242 has a diameter approximately 1.4 times as large as a diameter of the hole body 241. The bushing 25 has a sleeve portion 251 and a flange portion 252 continuously formed on a lower end of the sleeve portion 251. An outer peripheral surface of the sleeve portion 251 is in close contact with an inner peripheral surface of the hole body 241. The flange portion 252 is accommodated in the large diameter portion 242. In this embodiment, the opening edge 255 of the bushing 25 practically forms an opening edge of the receiving hole 24. As shown in FIG. 7, an upper edge 253 of the sleeve portion 251 is disposed at a position slightly lower than the upper surface 21A of the base frame 21. On the other hand, a lower end surface of the flange portion 252 is coplanar with the lower surface 21B of the base frame 21. A gap is formed between an outer periphery 254 of the flange portion 252 and an inner peripheral surface of the large diameter portion 242.

In a state where the lower surface 21B of the base frame 21 and the support surface 43 of the base member 4 are in contact with each other and the ball 50 is fitted in the receiving hole 24, the opening edge 255 positioned at a lower end of the bushing 25 forms a portion which is brought into line contact with a proximal portion of the semispherical protrusion formed by the ball 50. Strictly speaking, the contact portion 52 which is the portion of the ball 50 having the largest circumscribed circle and slightly projecting upward from the support surface 43 and the portion of the sleeve portion 251 slightly above the opening edge 255 are brought into line contact with each other. When chamfering is applied to the opening edge 255, there is a possibility that irregularities occur in a hole diameter of the receiving hole 24 (bushing 25) at the position of the opening edge 255 due to an error in such working. In this case, the favorable line contact cannot be formed thus giving rise to a possibility that rattling occurs in the base frame 21. Accordingly, the opening edge 255 of the bushing 25 is formed of the edge portion substantially having no chamfered structure (C: approximately 0.02 or less).

[Modification of Semispherical Protrusion and Receiving Hole]

Figure 8A:
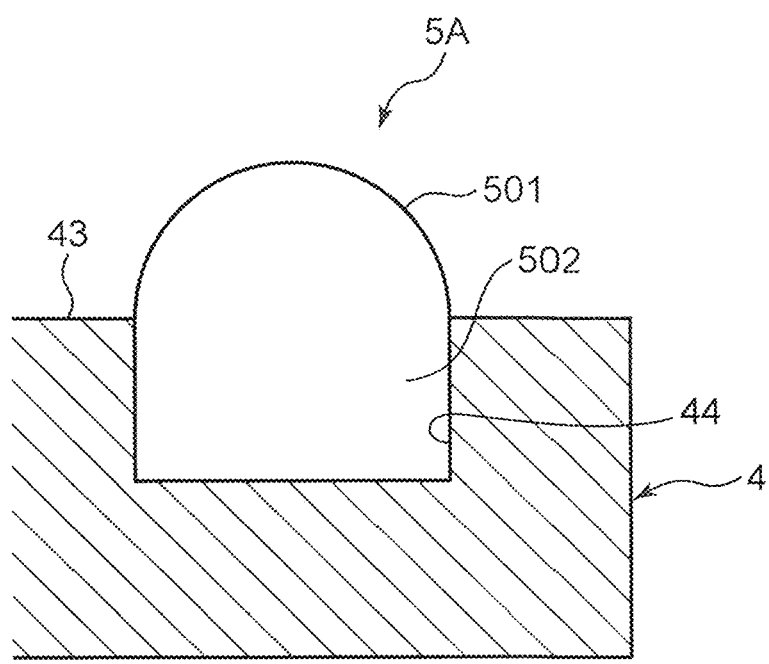
FIG. 8A is a cross-sectional view showing a modification of the semispherical protrusion.
Figure 8B:
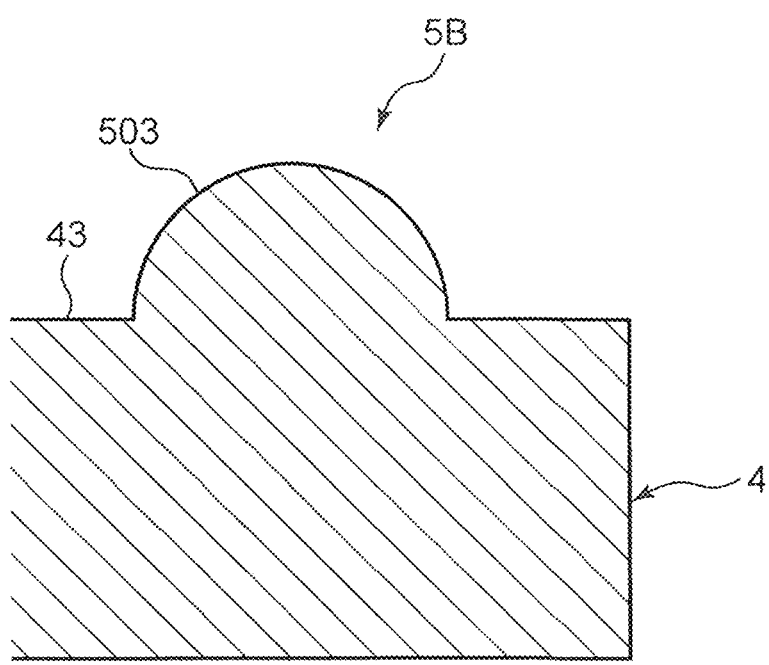
FIG. 8B is a cross-sectional view showing a modification of the semispherical protrusion.

FIG. 8A and FIG. 8B are cross-sectional views showing modifications of the semispherical protrusion 5 formed on the support surface 43 of the base member 4 in a protruding manner. In the above-mentioned embodiment, the case is exemplified where the semispherical protrusion 5 is formed of the ball 50. On the other hand, a semispherical protrusion 5A shown in FIG. 8A is formed of an artillery shell-like pin. The semispherical protrusion 5A is a pin where an upper half of the semispherical protrusion 5A is formed of a semispherical portion 501 and a lower half of the semispherical protrusion 5A is formed of a circular cylindrical portion 502. The circular cylindrical portion 502 is accommodated in the holding hole 44 of the base member 4, and the semispherical portion 501 protrudes from the support surface 43. A semispherical protrusion 5B shown in FIG. 8B is formed of a semispherical convex portion 503 integrally formed with the base member 4 and protruding from the support surface 43.

In this manner, the mode of formation of the semispherical protrusion 5 is not limited, and the semispherical protrusions 5A, 5B shown in FIG. 8A and FIG. 8B can be also adopted. However, from a point of view of a manufacturing cost, it is desirable that the semispherical protrusion 5 be formed of the ball 50 accommodated in the holding hole 44 such that the upper half of the ball 50 protrudes from the holding hole 44. Recently, a ball having an extremely high sphericity, that is, the above-mentioned ball of approximately 28 class can be obtained from a market easily and at a low cost. On the other hand, formation of the semispherical portion on one end of the circular cylindrical pin as in the case of the semispherical protrusion 5A shown in FIG. 8A or the formation of the semispherical protrusion 5B shown in FIG. 8B by cutting pushes up a cost. To the contrary, by forming the semispherical protrusion 5 using the ball 50, the semispherical protrusion 5 can be manufactured at a low cost while allowing the semispherical protrusion 5 to have high accuracy.

Figure 9A:
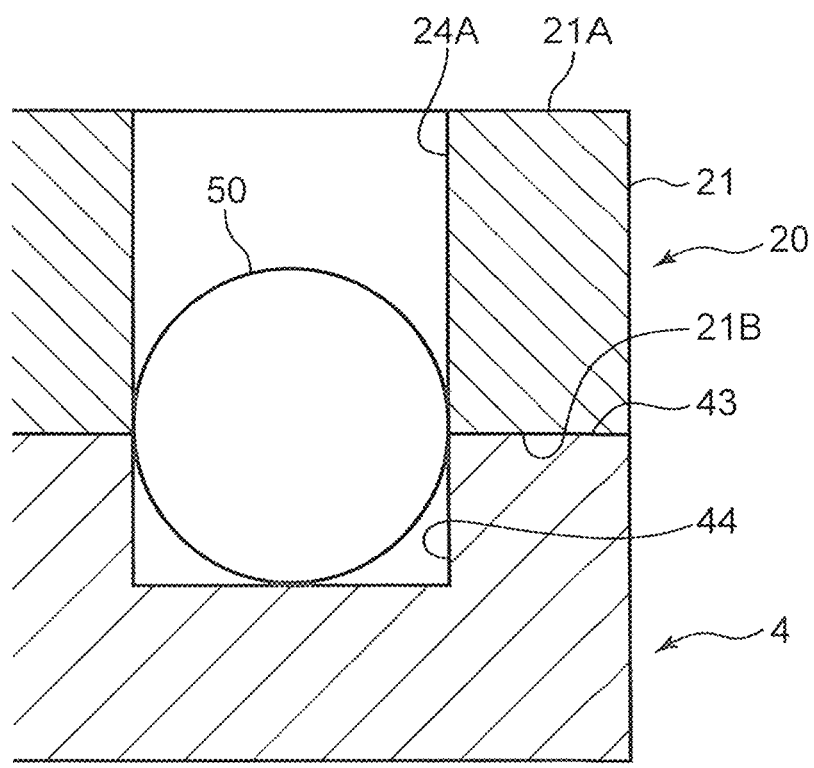
FIG. 9A is a cross-sectional view showing a modification of the receiving hole.
Figure 9B:
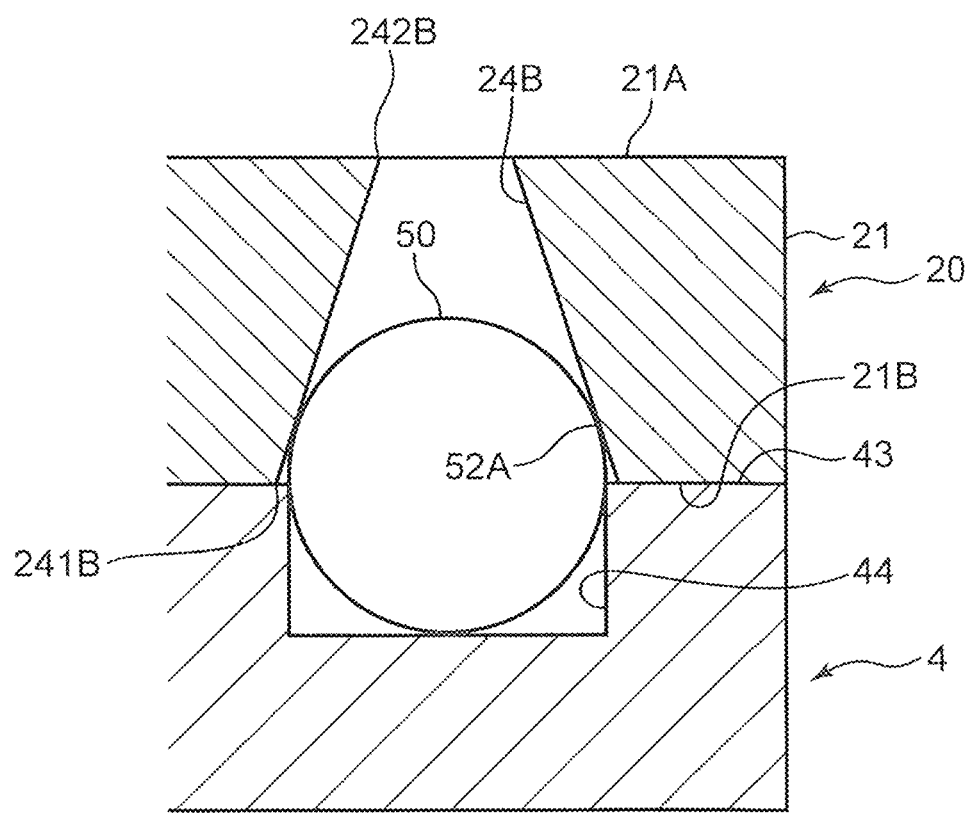
FIG. 9B is a cross-sectional view showing a modification of the receiving hole.

FIG. 9A and FIG. 9B are cross-sectional views showing modifications of the receiving hole 24. FIG. 9A illustrates a receiving hole 24A in which the bushing 25 is not fitted. The ball 50 and the holding hole 44 are equal to the ball 50 and the holding hole 44 described in the example shown in FIG. 4A to FIG. 6. The receiving hole 24A is a circular columnar hole which penetrates the base frame 21 in a vertical direction. An opening edge of a lower end of the receiving hole 24A is brought into line contact with the portion of the ball 50 having the largest circumscribed circle. When the base frame 21 has sufficient hardness, such a receiving hole 24A can be adopted.

FIG. 9B illustrates a receiving hole 24B having a tapered shape. The receiving hole 24B is a tapered hole where an opening 241B having a large diameter is formed on a lower surface 21B side, an opening 242B having a small diameter is formed on an upper surface 21A side, and a diameter of the receiving hole 24B is gradually decreased from a lower surface 21B side toward an upper surface 21A side. A diameter of the large-diameter opening 241B is larger than the diameter of the holding hole 44 and the diameter of the ball 50, and the diameter of the small-diameter opening 242B is smaller than the diameter of the ball 50. In such a receiving hole 24B, an inner peripheral surface of the receiving hole 24B positioned slightly above the large diameter opening 241B is brought into line contact with the outer peripheral surface of the ball 50 (different from the portion of the ball 50 having the largest circumscribed circle). The above-mentioned receiving hole 24B may be a frustoconical bottomed hole without forming the small-diameter opening 242B.

[Manner of Operation and Advantageous Effects]

According to the linear conveyor device 1 of this embodiment, the modules 20 of the straight-line conveyance part 2 are not directly installed on the platform 10 but are installed in a mode where the connecting portion J between the modules 20 is supported by the base member 4 from below. By interposing the base member 4 between the modules 20 and the platform 10, positioning of the modules 20 connected to each other can be performed using the base member 4. That is, without adopting the direct connection between the modules 20 or between the guide rails 23, the connection of the pair of modules 20 can be eventually achieved by positioning and mounting the respective modules 20 to be connected to each other on the base member 4. Accordingly, by increasing only forming accuracy of the base member 4, that is, by increasing positional accuracy of the positioning member (semispherical protrusion 5; ball 50 in the above-mentioned embodiment), accuracy of connection between the modules 20 can be enhanced automatically. Accordingly, a control of positioning of the modules 20 to be connected to each other can be facilitated. Further, the base member 4 is interposed between the modules 20 to be connected to each other and the platform 10 and hence, the modules 20 can be connected to each other without being affected by a state of the upper surface 10A of the platform 10. Accordingly, the modules 20 can be connected to each other simply with high accuracy.

In the above-mentioned embodiment, the positioning member is formed of the semispherical protrusions 5, and in a state where the lower surfaces 21B of the modules 20 (base frames 21) and the support surface 43 of the base member 4 are in contact with each other, a portion of the base frame 21 and the semispherical protrusion 5 are brought into line contact with each other. Specifically, the contact portion 52 (proximal portion) which is the portion of the ball 50 having the largest circumscribed circle is brought into line contact with the opening edge 255 of the receiving hole 24 (bushing 25) of the base frame 21. In this manner, the ball 50 and the receiving hole 24 are merely brought into line contact with each other and hence, the module 20 can be positioned with the minimum contact between the ball 50 and the receiving hole 24. Such a positioning mode has an advantage that at the time of assembling the base frame 21 to the base member 4, it is possible to suppress a jam (jam: the occurrence of a defect in assembling due to interference between the receiving hole 24 and the member to be inserted into the receiving hole 24).

Figure 10:
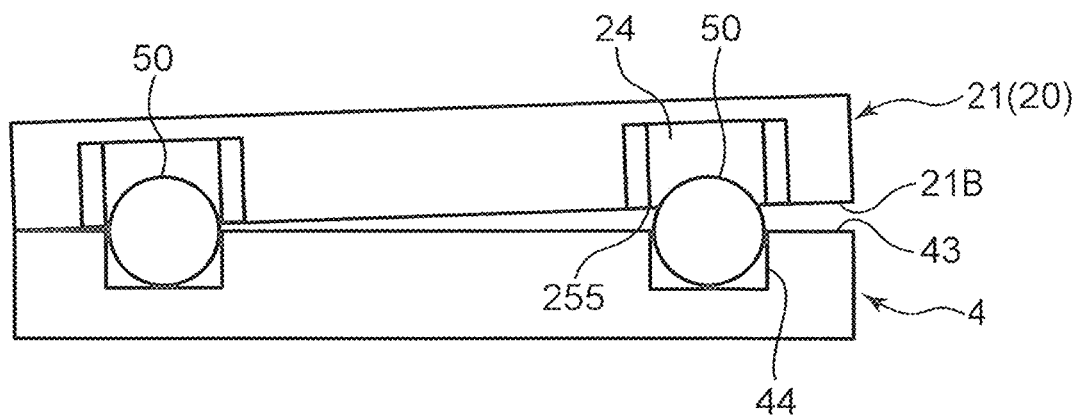
FIG. 10 is a schematic cross-sectional view showing a state where the base member is fitted in a base frame according to this embodiment.
Figure 11:
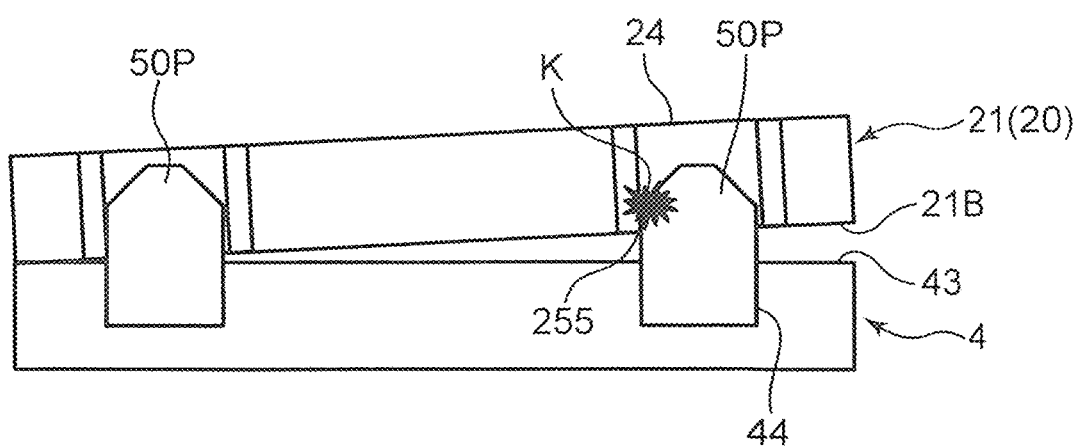
FIG. 11 is a schematic cross-sectional view showing a state where the base member is fitted in a base frame according to a comparison example.

The above-mentioned point is described with reference to FIG. 10 and FIG. 11. FIG. 10 is a schematic cross-sectional view showing a state where the base frame 21 is fitted in the base member 4, and FIG. 11 is a schematic cross-sectional view showing a comparison example provided for comparison with this embodiment. When the positioning member is formed of the ball 50 (semispherical protrusion 5) as in the case of this embodiment, as shown in FIG. 10, even when the base frame 21 is brought into contact with the support surface 43 of the base member 4 with a slight inclination (with a slight jam), the ball 50 functions as a guide for introducing the receiving hole 24 so that a jam does not occur. That is, a portion of the opening edge 255 of the receiving hole 24 (bushing 25) is guided by a spherical surface of the ball 50 and hence, when the lower surface 21B is brought into contact with the support surface 43, a peripheral surface (contact portion 52) of the ball 50 and the opening edge 255 are brought into a line contact state.

Further, with the use of two balls 50 in positioning the base frame 21 both in a longitudinal direction (X direction) and in a width direction (Y direction), working tolerance of the ball 50 (holding hole 44) at the mounting position can be absorbed. For example, it is assumed that an installation pitch error of 10 μm exists with respect to two balls 50 and the base frame 21 having the receiving holes 24 in which the two balls 50 are fitted is fitted on the two balls 50. In this case, centering of the base frame 21 is performed by the balls 50 and hence, an installation error of the base frame 21 can be suppressed to 5 μm which is half of 10 μm.

The comparison example shown in FIG. 11 shows the case where a knock pin 50P is used as a positioning member. The knock pin 50P is a circular columnar pin having a tapered upper end, and a circular columnar trunk portion is disposed such that the circular columnar trunk portion projects upward from the holding hole 44. In a state where a base frame 21 and a base member 4 overlap with each other, an outer peripheral surface of the circular columnar trunk portion and an inner peripheral surface of the receiving hole 24 are in face contact with each other. In this case, a jam K is liable to occur between the knock pin 50P and the receiving hole 24. Particularly, when the base frame 21 is brought into contact with the support surface 43 of the base member 4 in a slightly inclined manner, a jam K where an opening edge 255 of a receiving hole 24 butts against the circular columnar trunk portion occurs.

To prevent the occurrence of the jam K, it is necessary to install the base frame 21 to the base member 4 with no inclination. However, such an operation is difficult. Further, when there is an error in the installation position of the knock pin 50P, there is a possibility that the jam K occurs even when the base frame 21 is not inclined. Accordingly, a play becomes necessary for fitting engagement between the knock pin 50P and the receiving hole 24 and hence, it is difficult to form a connecting portion J with high accuracy. In an operation of making the knock pin 50P and the receiving hole 24 tightly engage with each other, there arises a possibility that the receiving hole 24 is deformed due to a frictional force such as the jam K. When the receiving hole 24 is deformed, as a matter of course, accuracy in connection of the modules 20 is lowered.

On the other hand, according to this embodiment, when the lower surface 21B of the base frame 21 and the support surface 43 of the base member 4 are brought into contact with each other, even when a frictional force is generated due to a contact surface on which a slight jam occurs or poor positioning accuracy of the ball 50, the upper semisphere of the ball 50 functions as a guide for introducing the receiving hole 24 and hence, the receiving hole 24 is minimally deformed. Particularly, in the above-mentioned embodiment, the receiving hole 24 in which the bushing 25 having high hardness is fitted is adopted and hence, the receiving hole 24 is further minimally deformed. Accordingly, the connection accuracy is minimally lowered and hence, it is possible to acquire favorable connection accuracy of the modules 20.

Further, the opening edge 255 of the receiving hole 24 is formed of the edge portion substantially having no chamfered structure. When chamfering is applied to the opening edge 255, there is a possibility that irregularities occur in a hole diameter of the receiving hole 24. On the other hand, even when chamfering is not applied to the opening edge 255, the ball 50 functions as a guide for introducing the receiving hole 24 and hence, fitting engagement between the receiving hole 24 and the ball 50 can be performed smoothly. In the comparison example shown in FIG. 11, applying of chamfering to the opening edge 255 is substantially indispensable. However, according to this embodiment, such chamfering is rather unnecessary.

[Exemplification of Linear Conveyor Device according to Another Embodiment]

Figure 12:
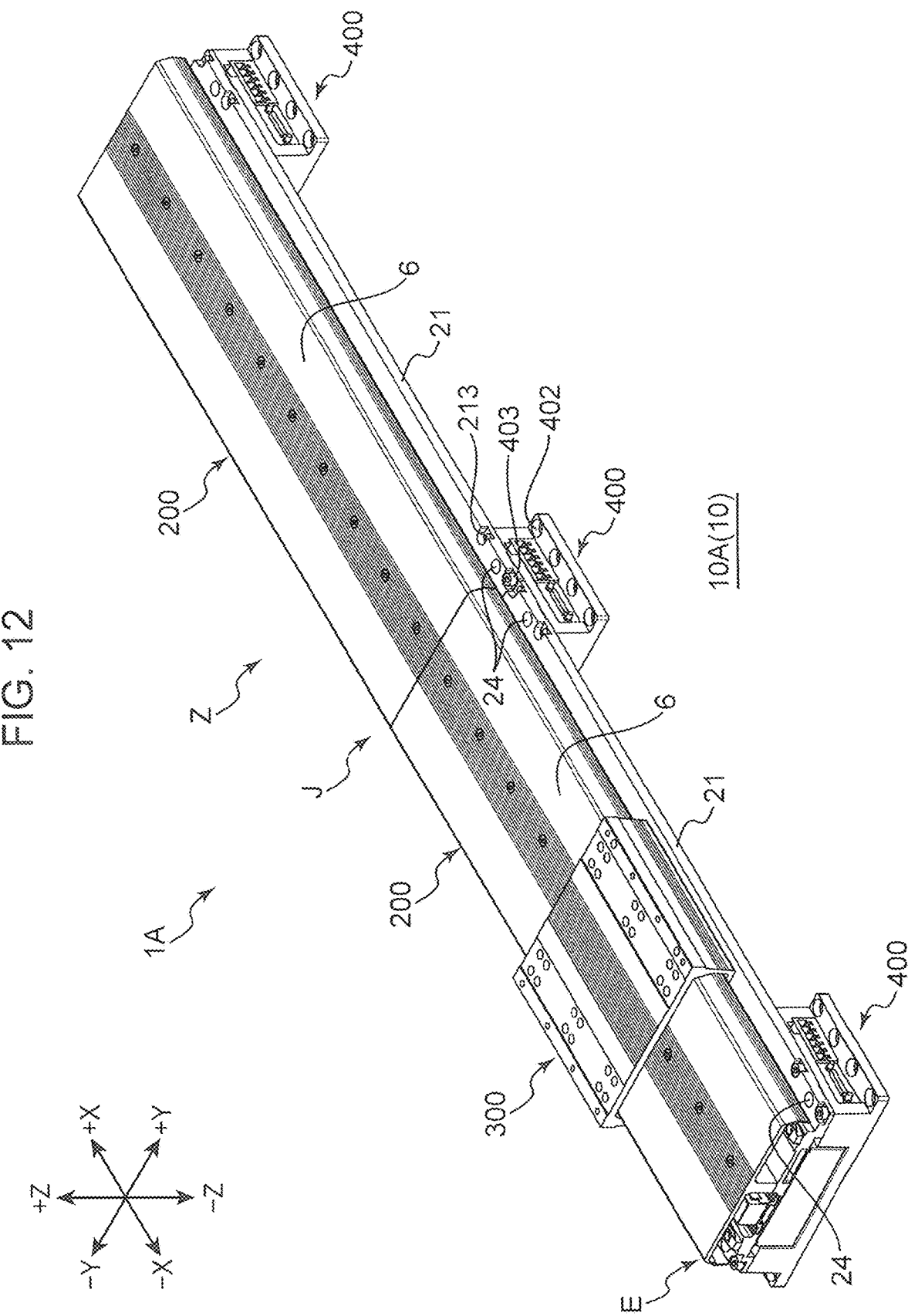
FIG. 12 is a perspective view showing an embodiment of a linear conveyor device which uses a module to which a cover member is attached.
Figure 13:
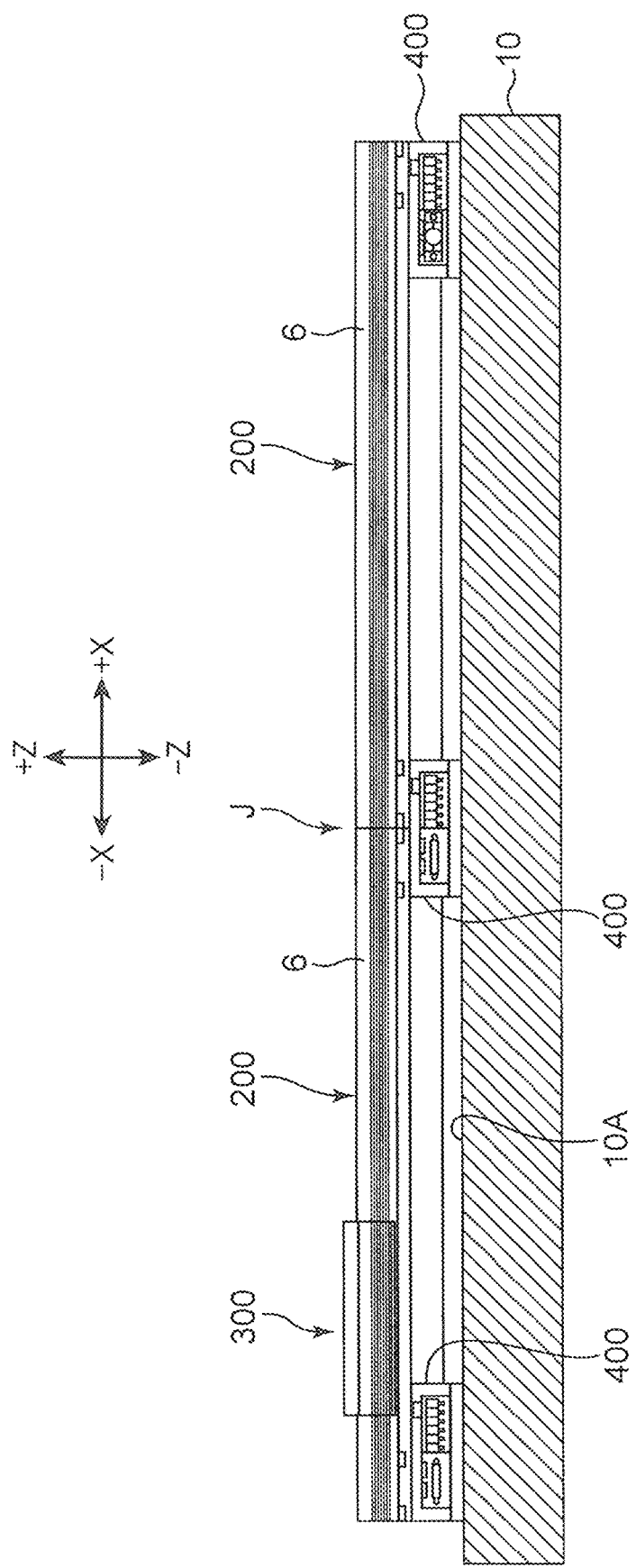
FIG. 13 is a side view of the linear conveyor device shown in FIG. 12.
Figure 14:
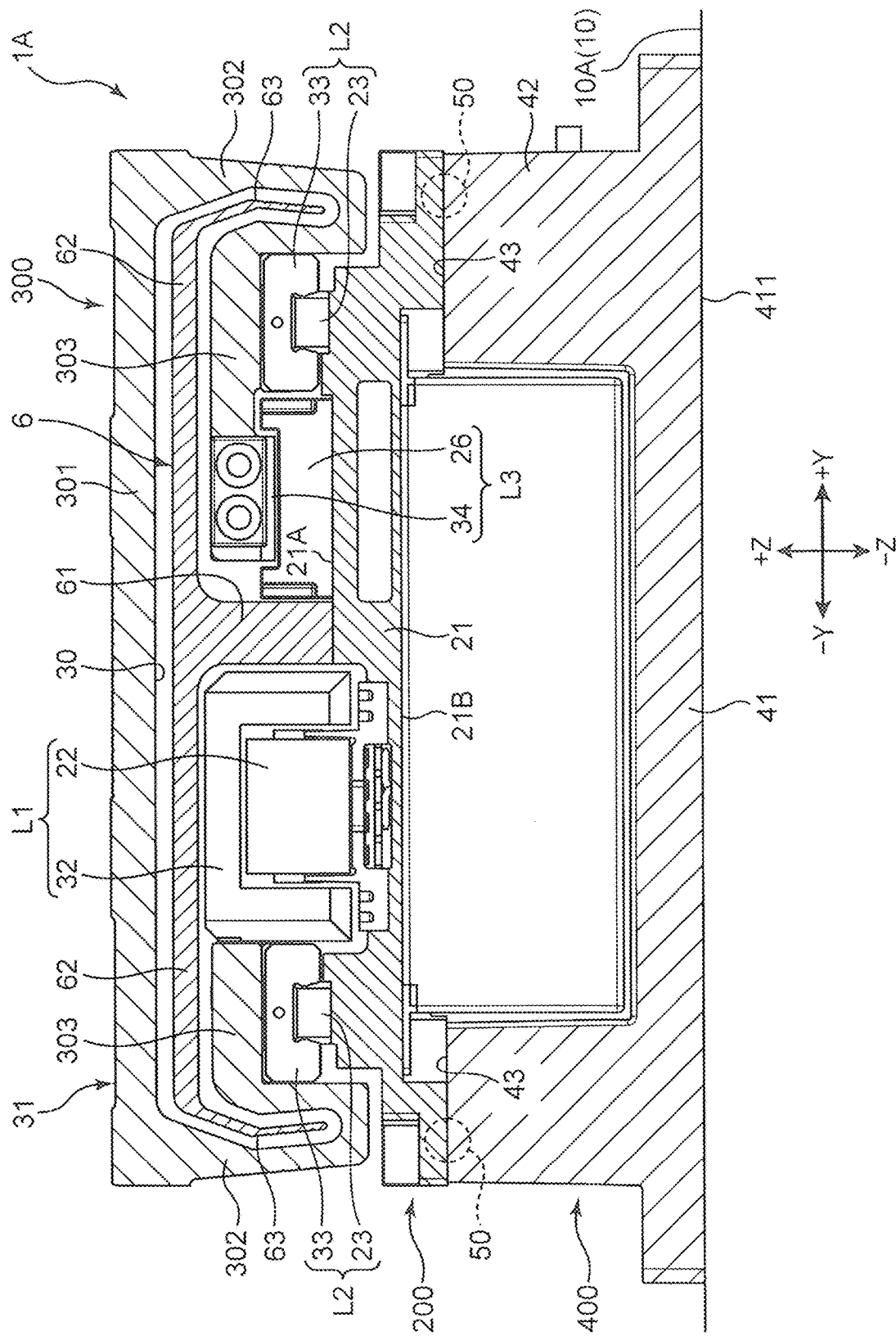
FIG. 14 is a cross-sectional view of a connecting portion of modules to each of which the cover member is attached taken along a plane extending in a Y direction.

Next, a linear conveyor device more similar to an actually used product is exemplified. FIG. 12 is a perspective view showing an embodiment of a linear conveyor device 1A according to another embodiment, FIG. 13 is a side view of the linear conveyor device 1A, and FIG. 14 is a cross-sectional view of a connecting portion J taken along a plane extending in a Y direction. A straight-line conveyance part 2 of the linear conveyor device 1A is formed of a connected body of modules 200 to each of which a cover member 6 is attached. A slider 300 is mounted on the straight-line conveyance part 2 in a movable manner in a state where the slider 300 is fitted on the cover member 6. The modules 200 are supported on base members 400 at the connecting portion J between the modules 200 and at terminal end portions E of the straight-line conveyance part 2. The base members 400 are disposed between a platform 10 and lower surfaces 21B of the modules 200 thus positioning and supporting the respective modules 200.

As shown in FIG. 14, the linear conveyor device 1A includes a linear motor L1, linear guides L2, and a linear scale L3. The linear motor L1 is formed of a linear motor stator 22 and a linear motor mover 32. The linear guides L2 are formed of a pair of guide rails 23 and a pair of guide blocks 33. The linear scale L3 is formed of magnetic sensor unit 26 and a magnetic scale 34.

The module 200 includes a base frame 21. The linear motor stator 22, the pair of guide rails 23, and the magnetic sensor unit 26 are mounted on an upper surface 21A of the base frame 21. The pair of guide rails 23 extends parallel to each other in an X direction, and is disposed at a position near a −Y end portion of the base frame 21 and at a position near a +y end portion of the base frame 21. The linear motor stator 22 (−Y side) and the magnetic sensor unit 26 (+Y side) are disposed between the pair of guide rails 23. The linear motor stator 22 is formed by arranging a plurality of electromagnets in a row in the X direction. The magnetic sensor unit 26 is also formed by arranging a plurality of electromagnets in a row in the X direction.

The cover member 6 is mounted on the upper surface 21A of the base frame 21 so as to cover the upper surface 21A. The cover member 6 includes a support leg 61, a horizontal cover portion 62, and a pair of side surface cover portions 63. That is, the cover member 6 is a member having an approximately T shape in cross section in the Y direction. The support leg 61 is raised at a center region of the base frame 21 in the Y direction. The horizontal cover portion 62 extends horizontally from an upper end of the support leg 61 toward a −Y side and a +Y side. The pair of side surface cover portions 63 respectively extends downward from a −Y side end portion and a +y side end portion of the horizontal cover portion 62 respectively. The horizontal cover portion 62 covers the linear motor stator 22, the pair of guide rails 23, and the magnetic sensor unit 26 mounted on the upper surface 21A of the base frame 21 from above, and the side surface cover portions 63 cover the sides of the components. Due to the provision of the cover member 6, intrusion of contaminant and a foreign material to the upper surface 21A can be prevented.

The slider 300 includes a slider frame 31 having: an upper plate 301 which is formed of a horizontal plate and on which a workpiece is placed; a pair of side plates 302 which extends downward from a −Y side end portion and a +Y side end portion of the upper plate 301 respectively; and a pair of lower plates 303 which extends from lower ends of the pair of side plates 302 toward the center in a width direction respectively. The upper plate 301, the side plates 302, and the lower plates 303 form a fitting portion 30 to be fitted on the cover member 6. The fitting portion 30 defines a cavity for receiving the cover member 6.

A guide block 33 is mounted on lower surfaces of the pair of lower plates 303 respectively. The linear motor mover 32 is mounted on an inner end surface of the −Y side lower plate 303, and the magnetic scale 34 is mounted on an inner end surface of the +Y side lower plate 303. The linear motor mover 32 includes: a plurality of permanent magnets arranged in the X direction; and a back yoke which holds the permanent magnets. The magnetic scale 34 includes the permanent magnets which are arranged such that an N pole and an S pole alternately appear on the surface of the magnetic scale 34 which faces the magnetic sensor unit 26.

The guide blocks 33 are engaged with the guide rails 23, and are guided by the guide rails 23 and are moved in the X direction. In a state where the guide blocks 33 and the guide rails 23 are engaged with each other, an inner peripheral surface of the fitting portion 30 and an outer peripheral surface of the cover member 6 face each other with a gap having a predetermined width formed therebetween. The linear motor mover 32 faces the linear motor stator 22, and the magnetic scale 34 also faces the magnetic sensor unit 26.

Figure 15:
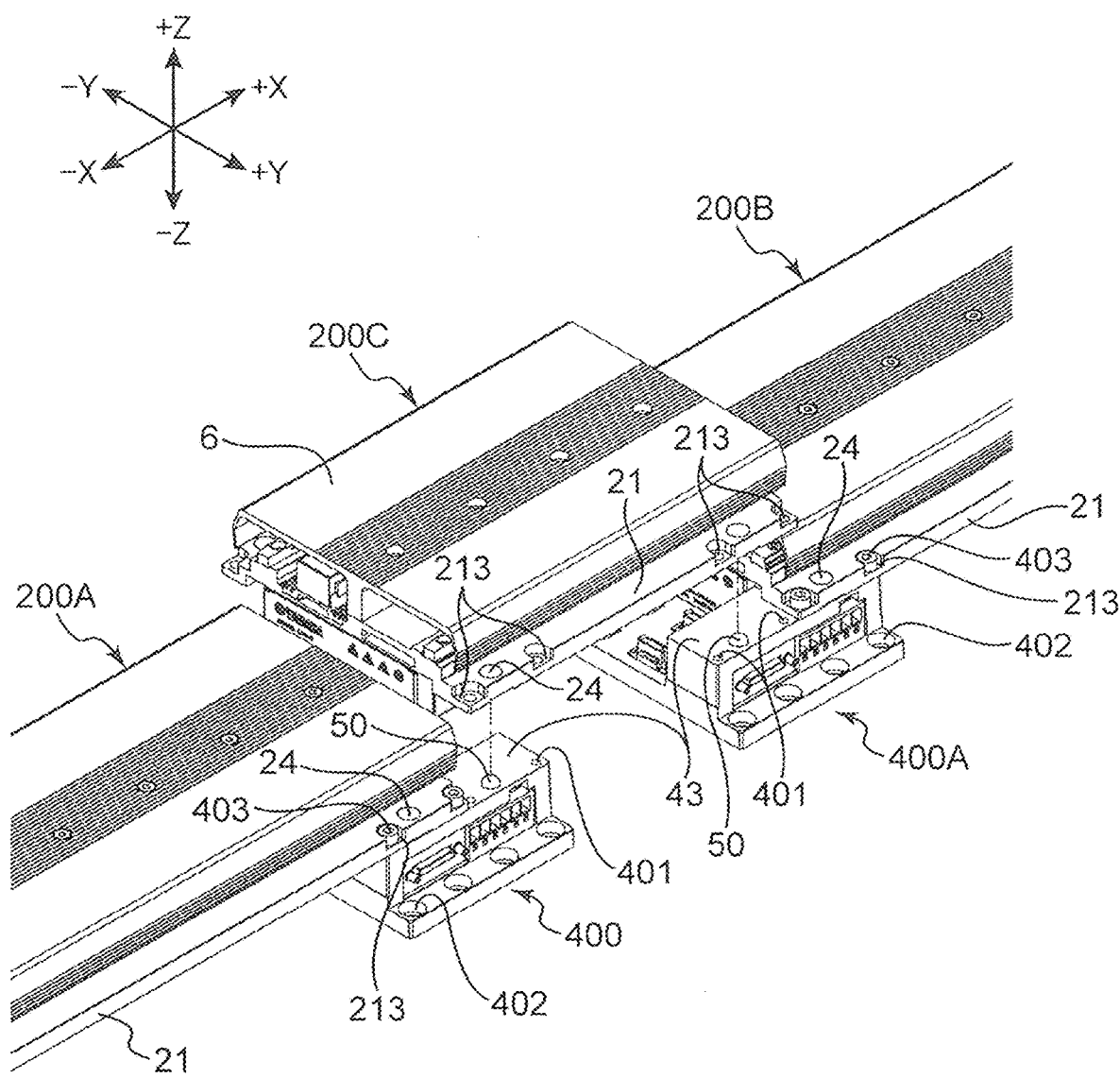
FIG. 15 is a perspective view showing an assembled example of the modules.

FIG. 15 is a perspective view showing an assembled example of the modules 200, and shows a portion of an upper surface portion of a base member 400. In the same manner as the base member 4 shown in FIG. 3, the base member 400 has a bottom plate 41, protruding ridges 42, and support surfaces 43. Balls 50 which form semispherical protrusions are disposed on the support surfaces 43. A bottom surface 411 of the bottom plate 41 is in contact with an upper surface 10A of a platform 10, and the support surfaces 43 support lower surfaces 21B of the base frames 21 at a connecting portion J between the modules 200. Another embodiment is substantially equal to the previously-mentioned embodiment with respect to the point that positioning of the pair of modules 200 to be connected to each other can be realized by mounting the modules 200 on the base member 400 such that the balls 50 are fitted in the receiving holes 24 formed in the base frames 21.

The base member 400 includes: first fixing portions 401 which are screw holes formed in the support surface 43 in a vertical direction; and second fixing portions 402 which are through holes formed in the vertical direction in a −Y side end portion and a +Y side end portion of the bottom plate 41. The first fixing portions 401 are threaded holes for detachably fixing each module 200 to the base member 400. Mounting holes 213 formed in the base frame 21 are made to overlap with the first fixing portions 401 from above, and fixing screws 403 are threadedly engaged with the first fixing portions 401 or the threaded engagement between the fixing screws 403 and the first fixing portions 401 is released. Accordingly, the module 200 is mounted on or removed from the base member 400.

On the other hand, the second fixing portions 402 are holes through which the base member 400 is fixed to the platform 10 in a detachable manner. The second fixing portions 402 are positioned to be aligned with bolt holes (not shown in the drawing) formed in the upper surface 10A, and are fastened to the platform 10 by bolts not shown in the drawing. In this manner, mounting and removal of the module 200 to and from the base member 400 and mounting and removal of the base member 400 to and from the platform 10 can be performed as desired and hence, the addition, the interruption, the exchange or the like of the module 200 can be easily performed.

In FIG. 15, a case is exemplified where a short third module 200C is interrupted between a first module 200A and a second module 200B. Assume that a connecting portion between the first and second modules 200A, 200B are supported on a first base member 400, in this case, a second base member 400A is newly added. In this case, the second module 200B is removed from the first base member 400, and the second module 200B is shifted by an amount equal to a length of the third module 200C in a +X direction. The second base member 400A is fixed to the platform 10 at the second fixing portions 402 at a pitch equal to the length of the third module 200C with respect to the first base member 400.

The second module 200B is mounted on +X side support surfaces 43 of the second base member 400A. On the other hand, +X side support surfaces 43 of the first base member 400 and −X side support surfaces 43 of the second base member 400A form support surfaces for supporting the third module 200C. The third module 200C is placed on the first and second base members 400, 400A such that balls 50 carried on the respective support surfaces 43 are fitted in receiving holes 24 formed on a −X side and on a +X side of the base frame 21 of the third module 200C. Then, the fixing screws 403 are threadedly engaged with the first fixing portions 401 through the mounting holes 213 and hence, the interruption operation of the third module 200C is completed.

In this manner, by merely mounting the third module 200C on the first and second base members 400, 400A having the balls 50 respectively, all parts necessary for constructing a linear conveyor can be connected to each other with high accuracy. That is, due to the above-mentioned mounting structure, a group of parts consisting of the linear motor stator 22, the guide rails 23, and the magnetic sensor unit 26 which the third module 200C includes are connected with the corresponding groups of parts which the first and second modules 200A, 200B respectively include in a highly accurately positioned state. Accordingly, the interruption of the third module 200C can be performed with a simple operation. An exchange of the third module 200C in the case where the first to third modules 200A to 200C are already connected to each other and the addition of a new module to a terminal end portion E of an existing straight-line conveyance part 2 and the like can be also performed with a simple operation substantially equal to the above-mentioned operation.

Besides the above-mentioned embodiments, the linear conveyor device 1 according to the present disclosure can adopt various modifications. For example, in the above-mentioned embodiments, the case is exemplified where the predetermined installation surface is the upper surface 10A of the platform 10 extending in the horizontal direction, and the linear conveyor device 1 is installed on the upper surface 10A. In place of such a configuration, the linear conveyor device 1 may be mounted on an installation surface extending in a vertical direction in a wall-suspending manner by raising a platform 10 in a vertical direction or the like. Further, the linear conveyor device 1 may be installed upside down as compared to the above-mentioned embodiment such that the installation surface faces downward and the upper surface 21A of the module 20 faces downward. Still further, columnar installation bases each having an installation surface on a top portion thereof are arranged at a predetermined pitch, and the base members 4 are mounted on the installation surface.

In the above-mentioned embodiment, the case is exemplified where the linear motor stator 22 is mounted on the module 20. However, the linear motor stator 22 may be installed on members other than the module 20. For example, the linear motor stator 22 may be installed on the platform 10 or a motor module on which the linear motor stator 22 is arranged may be disposed close to the module 20.

The above-described specific embodiments mainly include the disclosures having the following configurations.

A linear conveyor device according to one aspect of the present disclosure is a linear conveyor device installed on a predetermined installation surface, the linear conveyor device including: a linear motor stator; a slider which includes a linear motor mover; a straight-line conveyance part formed by linearly connecting a plurality of modules to each other, the modules each including an upper surface which has a guide portion for guiding movement of the slider and a lower surface which faces the installation surface; and a base member disposed between the installation surface and the lower surfaces of the modules at a connecting portion between the modules, and configured to position and support the modules.

According to the linear conveyor device, the modules are not directly installed on the installation surface but the modules are installed in a mode where the connecting portion of the modules is supported on the base member. By interposing the base member between the modules and the installation surface, positioning of the modules to be connected to each other can be performed using the base member. That is, the modules are not directly connected to each other, but the modules to be connected to each other are positioned and mounted on the base member respectively so that the connection between the modules can be achieved eventually. Accordingly, a control of positioning of the modules can be facilitated. Further, the base member is interposed between the module and the installation surface and hence, the modules can be connected to each other without being affected by a state of the installation surface. Accordingly, the modules can be connected to each other simply with high accuracy.

In the above-mentioned linear conveyor device, it is desirable that the base member include a support surface which forms a mating surface with a lower surface of the module, and a positioning member for positioning the module which is formed on the support surface in a projecting manner, and the positioning member have a contact portion which is brought into line contact with a portion of the module in a state where the lower surface of the module and the support surface are in contact with each other.

According to this linear conveyor device, the positioning member is merely brought into line contact with a portion of the module and hence, the module is positioned by a minimum contact. Accordingly, when the lower surface of the module and the support surface are brought into face contact with each other, even when a frictional force is generated due to a contact surface on which a slight jam occurs or poor positioning accuracy of the positioning member, it is possible to make the occurrence of deformation on a portion of the module difficult. Accordingly, it is possible to minimize lowering of the connection accuracy.

In the above-mentioned linear conveyor device, it is desirable that the module include a base frame which forms at least the lower surface, the positioning member be a semispherical protrusion formed on the support surface in a protruding manner, a receiving hole into which the semispherical protrusion is fitted be formed in a recessed manner in a lower surface of the base frame, and an opening edge of the receiving hole be brought into line contact with a proximal portion of the semispherical protrusion.

According to the linear conveyor device, the semispherical protrusion is fitted in the receiving hole and hence, the module is positioned and a line contact state between the receiving hole and the semispherical protrusion can be also easily acquired. Further, when the lower surface of the module and the support surface are brought into face contact with each other, the semispherical protrusion functions as a guide for introducing the receiving hole and hence, it is possible to make the occurrence of a friction between the lower surface of the module and the support surface difficult. That is, the receiving hole is minimally deformed so that the receiving hole does not affect the connection accuracy.

In this case, it is desirable that a cylindrical member which is formed of a member having larger hardness than the base frame be inserted into the receiving hole, and a lower edge of the cylindrical member be an opening edge which is brought into line contact with the proximal portion of the semispherical protrusion. With such a configuration, even if a friction is generated between the lower surface of the module and the support surface when the lower surface of the module and the support surface are brought into face contact with each other, the deformation of the receiving hole can be suppressed.

Further, it is desirable that the opening edge of the receiving hole be an edge portion having substantially no chamfered structure. When the chamfering is applied to the opening edge, there is a possibility that irregularities occur in a hole diameter of the receiving hole. On the other hand, even when the chamfering is not applied to the opening edge, the semispherical protrusion functions as a guide for introducing the receiving hole and hence, fitting engagement between the semispherical protrusion and the receiving hole can be performed smoothly. Accordingly, it is desirable to enhance the connection accuracy by allowing the opening edge to substantially have no chamfering structure.

In the above-mentioned linear conveyor device, it is desirable that a holding hole be formed on the support surface of the base member in a recessed manner so as to face the receiving hole, and the semispherical protrusion be formed of a ball accommodated in the holding hole such that at least an upper half of the ball protrudes from the holding hole.

Recently, a ball having an extremely high sphericity can be obtained easily and at a low cost. On the other hand, the formation of the semispherical protrusion by cutting or the formation of the semispherical portion on one end of the circular cylindrical pin pushes up a cost. Accordingly, by forming the semispherical protrusion in a mode where the ball is accommodated in the holding hole, the linear conveyor device can be manufactured at a low cost while having high accuracy.

In this case, it is desirable that the holding hole be a bottomed hole having a flat bottom surface, and a depth of the holding hole from the opening edge to the bottom surface be slightly smaller than a radius of the ball.

According to this linear conveyor device, it is possible to make the largest circumscribed circle of the ball slightly project from the opening edge of the holding hole by merely bringing the ball into contact with the bottom surface of the holding hole. Further, the portion of the ball having the largest circumscribed circle is regarded as a contact portion which is brought into line contact with the receiving hole.

Further, it is desirable that the holding hole be a bottomed hole having a circular horizontal cross section and a flat bottom surface, a diameter of the holding hole be slightly larger than a diameter of the ball, and the opening edge of the holding hole be an edge portion substantially having no chamfered structure.

According to this linear conveyor device, the ball can be in contact with the bottom surface of the holding hole with certainty and, at the same time, chamfering is not applied to the opening edge of the holding hole and hence, it is possible to prevent the occurrence of irregularities in the hole diameter of the holding hole. Accordingly, it is possible to contribute to the enhancement of the connection accuracy.

In the above-mentioned linear conveyor device, it is desirable that the plurality of the semispherical protrusions be disposed in a width direction of the module orthogonal to a moving direction of the slider. With such a configuration, one module can be positioned by the plurality of semispherical protrusions and hence, positioning of the module can be performed in a stable manner.

In the above-mentioned linear conveyor device, it is desirable that the straight-line conveyance part include a first module and a second module, the base member be disposed at a connecting portion between an end portion of the first module and an end portion of the second module, and the support surface of the base member be disposed so as to stride over between lower surfaces of the base frames of the modules, a plurality of the semispherical protrusions be disposed along a moving direction of the slider, and the receiving hole include: a first receiving hole which is formed in a lower surface of the base frame of the first module and into which at least one of the semispherical protrusions is fitted; and the second receiving hole which is formed in a lower surface of the base frame of the second module and into which at least another one of the semispherical protrusions is fitted.

According to this linear conveyor device, the first module is positioned with respect to the base member due to fitting engagement between the first receiving hole and one of the semispherical protrusions, and the second module is positioned with respect to the base member due to fitting engagement between the second receiving hole and the other one of the semispherical protrusions. Accordingly, by controlling the positional relationship between the plurality of semispherical protrusions on the base member with high accuracy, the first and second modules can be connected to each other with high accuracy.

In the above-mentioned linear conveyor device, it is desirable that the guide portion be formed of a guide rail mounted on the base frame, and the guide rail be mounted on the base frame using a position of each of the semispherical protrusions as a reference.

According to this linear conveyor device, the position of the guide rail is determined based on the position of the semispherical protrusions. That is, it is possible to complete the positioning of the guide rail by fitting the semispherical protrusions into the receiving holes of the modules to be connected. Further, it is also possible to achieve the connection of the guide rails with high accuracy.

In the linear conveyor device, it is preferable that the base member have: a first fixing portion which performs detachable fixing with respect to the module; and a second fixing portion which performs detachable fixing with respect to the installation surface.

According to this linear conveyor device, the mounting and removal of the module to and from the base member and the mounting and removal of the base member to and from the installation surface can be performed as desired and hence, the addition, the interruption, an exchange and the like of the module can be easily performed irrespective of a state of the installation surface.

As has been described heretofore, according to the linear conveyor device of the present disclosure, it is possible to provide a linear conveyor device where modules of a linear conveyor can be easily connected to each other with high accuracy. Accordingly, the present disclosure can contribute to easiness of operations such as installation, maintenance, and changing in layout of the linear conveyor device, an exchange of a module and the like on a user side.

What is claimed is:

1. A linear conveyor device installed on a predetermined installation surface, the linear conveyor device comprising:
    a linear motor stator;
    a slider which includes a linear motor mover;
    a straight-line conveyor formed by linearly connecting a plurality of modules to each other, the modules each including a base frame, the base frame having an upper surface on which the linear motor stator and a guide configured to guide movement of the slider are mounted and a lower surface which faces the installation surface; and
    a base disposed between the installation surface and the lower surface of the base frame at a connecting portion between the modules, and configured to position and support the modules.

2. The linear conveyor device according to claim 1, wherein
    the base includes a support surface which forms a mating surface with the lower surface of the base frame, and a positioner configured to position at least one of the modules, the positioner being formed on the support surface in a projecting manner, and
    the positioner has a contact portion which is brought into line contact with a portion of the frame in a state where the lower surface of the base frame and the support surface are in contact with each other.

3. The linear conveyor device according to claim 2, wherein
    the positioner is at least one semispherical protrusion formed on the support surface in a protruding manner,
    a receiving hole into which the semispherical protrusion is fitted is formed in a recessed manner in the lower surface of the base frame, and
    an opening edge of the receiving hole is brought into line contact with a proximal portion of the semispherical protrusion.

4. The linear conveyor device according to claim 3, wherein
    a cylindrical member having larger hardness than the base frame is inserted into the receiving hole, and a lower edge of the cylindrical member is an opening edge which is brought into line contact with the proximal portion of the semispherical protrusion.

5. The linear conveyor device according claim 4, wherein
    a holding hole is formed in the support surface of the base in a recessed manner so as to face the receiving hole, and
    the semispherical protrusion is formed of a ball accommodated in the holding hole such that at least an upper half of the ball protrudes from the holding hole.

6. The linear conveyor device according to claim 4, wherein
    a plurality of the semispherical protrusions are disposed in a width direction of the at least one of the modules orthogonal to a moving direction of the slider.

7. The linear conveyor device according to claim 4, wherein
    the straight-line conveyor includes as the plurality of modules a first module and a second module,
    the base is disposed at a connecting portion between an end portion of the first module and an end portion of the second module, and the support surface of the base is disposed so as to stride over lower surfaces of the base frames of the modules,
    a plurality of the semispherical protrusions are disposed along a moving direction of the slider, and
    the receiving hole includes:
        a first receiving hole which is formed in a lower surface of the base frame of the first module and into which at least one of the semispherical protrusions is fitted; and
        a second receiving hole which is formed in a lower surface of the base frame of the second module and into which at least another one of the semispherical protrusions is fitted.

8. The linear conveyor device according to claim 4, wherein
    the guide is formed of a guide rail mounted on the base frame, and
    the guide rail is mounted on the base frame using a position of each of the semispherical protrusions as a reference.

9. The linear conveyor device according to claim 3, wherein
the opening edge of the receiving hole is an edge portion having substantially no chamfered structure.

10. The linear conveyor device according claim 9, wherein
a holding hole is formed in the support surface of the base in a recessed manner so as to face the receiving hole, and
the semispherical protrusion is formed of a ball accommodated in the holding hole such that at least an upper half of the ball protrudes from the holding hole.

11. The linear conveyor device according to claim 9, wherein
a plurality of the semispherical protrusions are disposed in a width direction of the at least one of the modules orthogonal to a moving direction of the slider.

12. The linear conveyor device according to claim 3, wherein
a holding hole is formed in the support surface of the base in a recessed manner so as to face the receiving hole, and
the semispherical protrusion is formed of a ball accommodated in the holding hole such that at least an upper half of the ball protrudes from the holding hole.

13. The linear conveyor device according to claim 12, wherein
the holding hole is a bottomed hole having a flat bottom surface, and
a depth of the holding hole from an opening edge to the bottom surface is slightly smaller than a radius of the ball.

14. The linear conveyor device according to claim 12, wherein
the holding hole is a bottomed hole having a circular horizontal cross section and a flat bottom surface,
a diameter of the holding hole is slightly larger than a diameter of the ball, and
an opening edge of the holding hole is an edge portion substantially having no chamfered structure.

15. The linear conveyor device according to claim 12, wherein
a plurality of the semispherical protrusions are disposed in a width direction of the at least one of the modules orthogonal to a moving direction of the slider.

16. The linear conveyor device according to claim 3, wherein
a plurality of the semispherical protrusions are disposed in a width direction of the at least one of the modules orthogonal to a moving direction of the slider.

17. The linear conveyor device according to claim 3, wherein
the straight-line conveyor includes as the plurality of modules a first module and a second module,
the base is disposed at a connecting portion between an end portion of the first module and an end portion of the second module, and the support surface of the base is disposed so as to stride over lower surfaces of the base frames of the modules,
a plurality of the semispherical protrusions are disposed along a moving direction of the slider, and
the receiving hole includes: a first receiving hole which is formed in a lower surface of the base frame of the first module and into which at least one of the semispherical protrusions is fitted; and a second receiving hole which is formed in a lower surface of the base frame of the second module and into which at least another one of the semispherical protrusions is fitted.

18. The linear conveyor device according to claim 3, wherein
the guide is formed of a guide rail mounted on the base frame, and
the guide rail is mounted on the base frame using a position of each of the semispherical protrusions as a reference.

19. The linear conveyor device according to claim 2, wherein
the base has a first fixing portion which performs detachable fixing with respect to the at least one of the modules, and a second fixing portion which performs detachable fixing with respect to the installation surface.

20. A linear conveyor device installed on a predetermined installation surface, the linear conveyor device comprising:
a linear motor stator;
a slider which includes a linear motor mover;
a straight-line conveyor formed by linearly connecting a plurality of modules to each other, the modules each including an upper surface which has a guide configured to guide movement of the slider and a lower surface which faces the installation surface; and
a base disposed between the installation surface and the lower surfaces of the modules at a connecting portion between the modules, and configured to position and support the modules, wherein
the base has a first fixing portion which performs detachable fixing with respect to at least one of the modules, and a second fixing portion which performs detachable fixing with respect to the installation surface.

* * * * *